United States Patent
Locket et al.

(10) Patent No.: US 8,457,476 B2
(45) Date of Patent: *Jun. 4, 2013

(54) MULTIMEDIA SIGNAL PROCESSING SYSTEM

(75) Inventors: David Locket, Los Gatos, CA (US);
Kurtis G. Heaton, Pleasanton, CA (US);
James M. Barton, Alviso, CA (US);
Jean Swey Kao, Cupertino, CA (US);
Ching Tong Chow, Los Altos, CA (US);
Roderick James McInnis, Milpitas, CA (US); Andrew Martin Goodman, Portola Valley, CA (US)

(73) Assignee: TiVo Inc., Alviso, CA (US)

( * ) Notice: Subject to any disclaimer, the term of this patent is extended or adjusted under 35 U.S.C. 154(b) by 964 days.

This patent is subject to a terminal disclaimer.

(21) Appl. No.: 12/498,335

(22) Filed: Jul. 6, 2009

(65) Prior Publication Data

US 2009/0269024 A1    Oct. 29, 2009

Related U.S. Application Data

(63) Continuation of application No. 09/935,426, filed on Aug. 22, 2001, now Pat. No. 7,558,472, which is a continuation-in-part of application No. 09/827,029, filed on Apr. 5, 2001, now abandoned, which is a continuation of application No. 09/126,071, filed on Jul. 30, 1998, now Pat. No. 6,233,389.

(60) Provisional application No. 60/226,856, filed on Aug. 22, 2000.

(51) Int. Cl.
*H04N 5/917* (2006.01)
*H04N 5/84* (2006.01)

(52) U.S. Cl.
USPC ............................. 386/330; 386/332

(58) Field of Classification Search
USPC ............... 386/330, 332, 334, 338, 353, 355, 386/356
See application file for complete search history.

(56) References Cited

U.S. PATENT DOCUMENTS 2,865,990 A    12/1958    Towler
3,682,363 A    8/1972     Hull
(Continued)

FOREIGN PATENT DOCUMENTS

CA    2 137 745    12/1994
CN    1189045      7/1998
(Continued)

OTHER PUBLICATIONS

U.S. District Court in the Eastern District of Texas, Marshall Division, *Verizon Service Corp. and Verizon Corporation Resources Group LLC, Invalidity Contentions, TiVo Inc. v. Verizon Communications, Inc.*, Case No. 2:09-cv-257, 44 pages, Apr. 2010.

(Continued)

*Primary Examiner* — Robert Chevalier
(74) *Attorney, Agent, or Firm* — Hickman Palermo Truong Becker Bingham Wong LLP; Kirk D. Wong

(57) ABSTRACT

A multimedia signal processing system utilizes an easily manipulated, low-cost storage and display system that allows the user to view a television program and instantly review previous scenes within the program. The invention also allows the user to store selected programs while simultaneously watching or reviewing another. A versatile system architecture enables providing the invention in multiple configurations, each adapted to receive input signals from a different source. At the highest level, the system includes an input section and an output section. Across all configurations, the output section remains substantially the same, while the input section varies according to the signal type and the source. Thus, several configurations are provided, each one requiring only minor system board modifications. The system architecture thus simplifies the design and manufacturing challenge presented by producing units to serve different markets, such as digital satellite, digital cable and analog cable.

14 Claims, 23 Drawing Sheets

U.S. PATENT DOCUMENTS

| | | |
|---|---|---|
| 3,942,190 A | 3/1976 | Detwiler |
| 4,141,039 A | 2/1979 | Yamamoto |
| 4,221,176 A | 9/1980 | Besore |
| 4,224,481 A | 9/1980 | Russell |
| 4,233,628 A | 11/1980 | Ciciora |
| 4,258,418 A | 3/1981 | Heath |
| 4,306,250 A | 12/1981 | Summers et al. |
| 4,313,135 A | 1/1982 | Cooper |
| 4,347,527 A | 8/1982 | Lainez |
| 4,388,659 A | 6/1983 | Lemke |
| 4,408,309 A | 10/1983 | Kiesling et al. |
| 4,423,480 A | 12/1983 | Bauer et al. |
| 4,439,785 A | 3/1984 | Leonard |
| 4,506,348 A | 3/1985 | Miller et al. |
| 4,506,358 A | 3/1985 | Montgomery |
| 4,566,034 A | 1/1986 | Harger et al. |
| 4,602,297 A | 7/1986 | Reese |
| 4,633,331 A | 12/1986 | McGrady et al. |
| 4,665,431 A | 5/1987 | Cooper |
| 4,688,106 A | 8/1987 | Keller et al. |
| 4,689,022 A | 8/1987 | Peers et al. |
| 4,706,121 A | 11/1987 | Young |
| 4,723,181 A | 2/1988 | Hickok |
| 4,752,834 A | 6/1988 | Koombes |
| 4,755,889 A | 7/1988 | Schwartz |
| 4,760,442 A | 7/1988 | O'Connell et al. |
| 4,761,684 A | 8/1988 | Clark et al. |
| 4,789,961 A | 12/1988 | Tindall |
| 4,805,217 A | 2/1989 | Morihiro et al. |
| 4,816,905 A | 3/1989 | Tweedy et al. |
| 4,821,121 A | 4/1989 | Beaulier |
| 4,833,710 A | 5/1989 | Hirashima |
| 4,876,670 A | 10/1989 | Nakabayashi et al. |
| 4,891,715 A | 1/1990 | Levy |
| 4,897,867 A | 1/1990 | Foster et al. |
| 4,920,533 A | 4/1990 | Dufresne et al. |
| 4,924,387 A | 5/1990 | Jeppesen et al. |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,396 A | 11/1990 | Rafner |
| 4,979,050 A | 12/1990 | Westland et al. |
| RE33,535 E | 2/1991 | Cooper |
| 4,991,033 A | 2/1991 | Takeshita |
| 5,001,568 A | 3/1991 | Efron et al. |
| 5,014,125 A | 5/1991 | Pocock et al. |
| 5,018,186 A | 5/1991 | Kimura et al. |
| 5,019,900 A | 5/1991 | Clark et al. |
| 5,021,893 A | 6/1991 | Scheffler |
| 5,027,241 A | 6/1991 | Hatch et al. |
| 5,027,400 A | 6/1991 | Baji et al. |
| 5,047,857 A | 9/1991 | Duffield et al. |
| 5,057,932 A | 10/1991 | Lang |
| 5,063,453 A | 11/1991 | Yoshimura et al. |
| 5,089,885 A | 2/1992 | Clark |
| 5,093,718 A | 3/1992 | Hoarty et al. |
| 5,109,281 A | 4/1992 | Kobori et al. |
| 5,118,105 A | 6/1992 | Brim et al. |
| 5,121,476 A | 6/1992 | Yee |
| 5,124,854 A | 6/1992 | Iyota et al. |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,142,532 A | 8/1992 | Adams |
| 5,153,726 A | 10/1992 | Billing |
| 5,155,663 A | 10/1992 | Harase |
| 5,168,353 A | 12/1992 | Walker et al. |
| 5,172,413 A | 12/1992 | Bradley et al. |
| 5,202,761 A | 4/1993 | Cooper |
| 5,208,665 A | 5/1993 | McCalley et al. |
| 5,214,768 A | 5/1993 | Martin et al. |
| 5,222,150 A | 6/1993 | Tajima |
| 5,226,141 A | 7/1993 | Esbensen |
| 5,227,876 A | 7/1993 | Cucchi et al. |
| 5,233,423 A | 8/1993 | Jernigan et al. |
| 5,233,603 A | 8/1993 | Takeuchi |
| 5,237,648 A | 8/1993 | Mills et al. |
| 5,241,428 A | 8/1993 | Goldwasser et al. |
| 5,245,430 A | 9/1993 | Nishimura |
| 5,247,347 A | 9/1993 | Litteral et al. |
| 5,251,009 A | 10/1993 | Bruno |
| 5,253,275 A | 10/1993 | Yurt et al. |
| 5,283,659 A | 2/1994 | Akiyama et al. |
| 5,285,272 A | 2/1994 | Bradley et al. |
| 5,287,182 A | 2/1994 | Haskell |
| 5,311,423 A | 5/1994 | Clark |
| 5,317,556 A | 5/1994 | Tsuboi et al. |
| 5,317,603 A | 5/1994 | Osterweil |
| 5,317,604 A | 5/1994 | Osterweil |
| 5,329,307 A | 7/1994 | Takemura |
| 5,329,320 A | 7/1994 | Yifrach |
| 5,357,276 A | 10/1994 | Banker et al. |
| 5,361,261 A | 11/1994 | Edem et al. |
| 5,363,362 A | 11/1994 | Maeda et al. |
| 5,371,551 A | 12/1994 | Logan et al. |
| 5,377,051 A * | 12/1994 | Lane et al. ............ 386/314 |
| 5,388,264 A | 2/1995 | Tobias, II et al. |
| 5,406,626 A | 4/1995 | Ryan |
| 5,412,416 A | 5/1995 | Nemirofsky |
| 5,414,455 A | 5/1995 | Hooper et al. |
| 5,428,731 A | 6/1995 | Powers |
| 5,438,423 A | 8/1995 | Lynch et al. |
| 5,440,334 A | 8/1995 | Walters et al. |
| 5,442,390 A | 8/1995 | Hooper et al. |
| 5,452,006 A | 9/1995 | Auld |
| 5,475,498 A | 12/1995 | Radice |
| 5,475,656 A | 12/1995 | Sato et al. |
| 5,477,263 A | 12/1995 | O'Callaghan et al. |
| 5,479,056 A | 12/1995 | Mabuchi |
| 5,481,542 A | 1/1996 | Logston et al. |
| 5,485,611 A | 1/1996 | Astle |
| 5,486,687 A | 1/1996 | Le Roux |
| 5,488,409 A | 1/1996 | Yuen et al. |
| 5,488,433 A | 1/1996 | Washino et al. |
| 5,497,244 A | 3/1996 | Chargin, Jr. et al. |
| 5,506,615 A | 4/1996 | Awaji |
| 5,506,902 A | 4/1996 | Kubota |
| 5,508,940 A | 4/1996 | Rossmere et al. |
| 5,510,858 A | 4/1996 | Shido et al. |
| 5,513,011 A | 4/1996 | Matsumoto et al. |
| 5,513,306 A | 4/1996 | Mills et al. |
| 5,519,684 A | 5/1996 | Iizuka et al. |
| 5,521,630 A | 5/1996 | Chen et al. |
| 5,528,281 A | 6/1996 | Grady et al. |
| 5,528,282 A | 6/1996 | Voeten et al. |
| 5,535,008 A | 7/1996 | Yamagishi |
| 5,535,137 A | 7/1996 | Rossmere et al. |
| 5,537,157 A | 7/1996 | Washino et al. |
| 5,546,250 A | 8/1996 | Diel |
| 5,550,594 A | 8/1996 | Cooper et al. |
| 5,550,982 A | 8/1996 | Long et al. |
| 5,555,463 A | 9/1996 | Staron |
| 5,557,724 A | 9/1996 | Sampat et al. |
| 5,559,999 A | 9/1996 | Maturi et al. |
| 5,563,714 A | 10/1996 | Inoue et al. |
| 5,572,261 A | 11/1996 | Cooper |
| 5,572,442 A | 11/1996 | Schulhof et al. |
| 5,574,662 A | 11/1996 | Windrem et al. |
| 5,577,190 A | 11/1996 | Peters |
| 5,581,479 A | 12/1996 | McLaughlin et al. |
| 5,583,561 A | 12/1996 | Baker et al. |
| 5,583,652 A | 12/1996 | Ware |
| 5,584,043 A | 12/1996 | Burkart |
| 5,586,264 A | 12/1996 | Belknap et al. |
| 5,590,195 A | 12/1996 | Ryan |
| 5,596,581 A | 1/1997 | Saeijs et al. |
| 5,598,352 A | 1/1997 | Rosenau et al. |
| 5,600,364 A | 2/1997 | Hendricks et al. |
| 5,600,379 A | 2/1997 | Wagner |
| 5,603,058 A | 2/1997 | Belknap et al. |
| 5,604,544 A | 2/1997 | Bertram |
| 5,612,749 A | 3/1997 | Bacher et al. |

| Patent No. | Date | Inventor |
|---|---|---|
| 5,614,940 A | 3/1997 | Cobbley et al. |
| 5,615,401 A | 3/1997 | Harscoet et al. |
| 5,619,247 A | 4/1997 | Russo |
| 5,619,337 A | 4/1997 | Naimpally |
| 5,625,464 A | 4/1997 | Compoint et al. |
| 5,629,732 A | 5/1997 | Moskowitz et al. |
| 5,635,984 A | 6/1997 | Lee |
| 5,642,171 A | 6/1997 | Baumgartner |
| 5,648,824 A | 7/1997 | Dunn et al. |
| 5,659,539 A | 8/1997 | Porter et al. |
| 5,659,653 A | 8/1997 | Diehl et al. |
| 5,664,044 A | 9/1997 | Ware |
| 5,668,948 A | 9/1997 | Belknap et al. |
| 5,675,388 A | 10/1997 | Cooper |
| 5,677,979 A | 10/1997 | Squicciarini et al. |
| 5,696,866 A | 12/1997 | Iggulden et al. |
| 5,696,868 A | 12/1997 | Kim et al. |
| 5,701,383 A | 12/1997 | Russo et al. |
| 5,703,655 A | 12/1997 | Corey et al. |
| 5,706,388 A | 1/1998 | Isaka |
| 5,712,976 A | 1/1998 | Falcon, Jr. et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| 5,724,474 A | 3/1998 | Oguro et al. |
| 5,729,516 A | 3/1998 | Tozaki et al. |
| 5,729,741 A | 3/1998 | Liaguno et al. |
| 5,751,282 A | 5/1998 | Girard et al. |
| 5,751,338 A | 5/1998 | Ludwig |
| 5,751,371 A | 5/1998 | Shintani |
| 5,751,806 A | 5/1998 | Ryan |
| 5,751,883 A | 5/1998 | Ottesen et al. |
| 5,754,254 A | 5/1998 | Kobayashi et al. |
| 5,761,166 A | 6/1998 | Sedlmayr et al. |
| 5,761,372 A | 6/1998 | Yoshinobu et al. |
| 5,761,417 A | 6/1998 | Henley et al. |
| 5,767,913 A | 6/1998 | Kassatly |
| 5,771,334 A | 6/1998 | Yamauchi et al. |
| 5,774,170 A | 6/1998 | Hite et al. |
| 5,774,186 A | 6/1998 | Brodsky et al. |
| 5,778,137 A | 7/1998 | Nielsen et al. |
| 5,787,225 A | 7/1998 | Honjo |
| 5,796,695 A | 8/1998 | Tsutsui |
| 5,805,763 A | 9/1998 | Lawler et al. |
| 5,805,804 A | 9/1998 | Laursen et al. |
| 5,805,821 A | 9/1998 | Saxena et al. |
| 5,808,607 A | 9/1998 | Brady et al. |
| 5,815,671 A | 9/1998 | Morrison |
| 5,815,689 A | 9/1998 | Shaw et al. |
| 5,822,493 A | 10/1998 | Uehara et al. |
| 5,828,848 A | 10/1998 | MacCormack et al. |
| 5,832,085 A | 11/1998 | Inoue et al. |
| 5,852,705 A | 12/1998 | Hanko et al. |
| 5,856,930 A | 1/1999 | Hosono |
| 5,862,342 A | 1/1999 | Winter et al. |
| 5,864,582 A | 1/1999 | Ander et al. |
| 5,864,682 A | 1/1999 | Porter et al. |
| 5,870,553 A | 2/1999 | Shaw et al. |
| 5,870,710 A | 2/1999 | Ozawa et al. |
| 5,889,915 A | 3/1999 | Hewton |
| 5,892,884 A | 4/1999 | Sugiyama et al. |
| 5,898,695 A | 4/1999 | Fujii et al. |
| 5,899,578 A | 5/1999 | Yanagihara et al. |
| 5,909,257 A | 6/1999 | Ohishi et al. |
| 5,911,030 A | 6/1999 | Kikuchi et al. |
| 5,914,941 A | 6/1999 | Janky |
| 5,920,572 A | 7/1999 | Washington et al. |
| 5,920,842 A | 7/1999 | Cooper et al. |
| 5,928,347 A | 7/1999 | Jones |
| 5,930,444 A | 7/1999 | Camhi et al. |
| 5,930,493 A | 7/1999 | Ottesen et al. |
| 5,937,138 A | 8/1999 | Fukuda et al. |
| 5,940,074 A | 8/1999 | Britt, Jr. et al. |
| 5,949,948 A | 9/1999 | Krause et al. |
| 5,949,954 A | 9/1999 | Young et al. |
| 5,956,716 A | 9/1999 | Kenner et al. |
| 5,963,202 A | 10/1999 | Polish |
| 5,973,679 A | 10/1999 | Abbott et al. |
| 5,990,881 A | 11/1999 | Inoue et al. |
| 5,991,496 A | 11/1999 | Kojitma |
| 5,995,709 A | 11/1999 | Tsuge |
| 5,999,691 A | 12/1999 | Takagi et al. |
| 5,999,698 A | 12/1999 | Nakai et al. |
| 6,002,832 A | 12/1999 | Yoneda |
| 6,005,562 A | 12/1999 | Shiga et al. |
| 6,005,564 A | 12/1999 | Ahmad et al. |
| 6,018,612 A | 1/2000 | Thomason et al. |
| 6,028,599 A | 2/2000 | Yuen et al. |
| 6,028,774 A | 2/2000 | Shin et al. |
| 6,094,234 A | 7/2000 | Nonomura et al. |
| RE36,801 E | 8/2000 | Logan et al. |
| 6,112,226 A | 8/2000 | Weaver et al. |
| 6,137,710 A | 10/2000 | Iwasaki et al. |
| 6,138,147 A | 10/2000 | Weaver et al. |
| 6,141,385 A | 10/2000 | Yamaji et al. |
| 6,151,059 A | 11/2000 | Schein et al. |
| 6,154,771 A | 11/2000 | Rangan et al. |
| 6,163,644 A | 12/2000 | Owashi et al. |
| 6,163,646 A | 12/2000 | Tanaka et al. |
| 6,167,083 A | 12/2000 | Sporer et al. |
| 6,169,843 B1 | 1/2001 | Lenihan et al. |
| 6,172,605 B1 | 1/2001 | Matsumoto et al. |
| 6,172,712 B1 | 1/2001 | Beard |
| 6,181,706 B1 | 1/2001 | Anderson et al. |
| 6,192,189 B1 | 2/2001 | Fujinami et al. |
| 6,198,877 B1 | 3/2001 | Kawamura et al. |
| 6,209,041 B1 | 3/2001 | Shaw et al. |
| 6,226,447 B1 | 5/2001 | Sasaki et al. |
| 6,229,532 B1 | 5/2001 | Fujii |
| 6,233,389 B1 | 5/2001 | Barton et al. |
| 6,243,741 B1 | 6/2001 | Utsumi |
| 6,249,641 B1 | 6/2001 | Yokota |
| 6,253,375 B1 | 6/2001 | Gordon et al. |
| 6,256,704 B1 | 7/2001 | Hlava et al. |
| 6,263,396 B1 | 7/2001 | Cottle et al. |
| 6,272,672 B1 | 8/2001 | Conway |
| 6,278,837 B1 | 8/2001 | Yasukohchi et al. |
| 6,282,209 B1 | 8/2001 | Kataoka et al. |
| 6,282,320 B1 | 8/2001 | Hasegawa et al. |
| 6,285,824 B1 | 9/2001 | Yanagihara et al. |
| 6,292,618 B1 | 9/2001 | Ohara et al. |
| 6,292,619 B1 | 9/2001 | Fujita et al. |
| 6,298,016 B1 | 10/2001 | Otsuka |
| 6,301,711 B1 | 10/2001 | Nusbickel |
| 6,304,714 B1 | 10/2001 | Krause et al. |
| 6,317,885 B1 | 11/2001 | Fries |
| 6,327,418 B1 | 12/2001 | Barton |
| 6,330,334 B1 | 12/2001 | Ryan |
| 6,330,675 B1 | 12/2001 | Wiser et al. |
| 6,332,175 B1 | 12/2001 | Birrell et al. |
| 6,341,195 B1 | 1/2002 | Mankovitz et al. |
| 6,343,179 B1 | 1/2002 | Suito et al. |
| 6,353,461 B1 | 3/2002 | Shore et al. |
| 6,356,708 B1 | 3/2002 | Krause et al. |
| 6,359,636 B1 | 3/2002 | Schindler et al. |
| 6,360,320 B1 | 3/2002 | Ishiguro et al. |
| 6,363,212 B1 | 3/2002 | Fujinami et al. |
| 6,400,407 B1 | 6/2002 | Zigmond et al. |
| 6,424,791 B1 | 7/2002 | Saib |
| 6,445,738 B1 | 9/2002 | Zdepski et al. |
| 6,445,872 B1 | 9/2002 | Sano et al. |
| RE37,881 E | 10/2002 | Haines |
| 6,477,123 B1 | 11/2002 | Hutter |
| 6,480,353 B1 | 11/2002 | Sacks et al. |
| 6,480,667 B1 | 11/2002 | O'Connor |
| 6,490,000 B1 | 12/2002 | Schaefer et al. |
| 6,496,647 B2 | 12/2002 | Arai et al. |
| 6,498,894 B2 | 12/2002 | Ito et al. |
| 6,504,990 B1 | 1/2003 | Abecassis |
| 6,516,467 B1 | 2/2003 | Schindler |
| 6,529,685 B2 | 3/2003 | Ottesen et al. |
| 6,535,465 B1 | 3/2003 | Shigetomi et al. |
| 6,542,695 B1 | 4/2003 | Akiba et al. |
| 6,546,556 B1 | 4/2003 | Kataoka et al. |
| 6,553,178 B2 | 4/2003 | Abecassis |
| 6,567,127 B1 | 5/2003 | Orr et al. |
| 6,694,200 B1 | 2/2004 | Naim |

| | | | | | |
|---|---|---|---|---|---|
| 6,697,944 B1 | 2/2004 | Jones et al. | GB | 2222742 | 8/1989 |
| 6,698,020 B1 | 2/2004 | Zigmond et al. | GB | 2 286 282 A | 8/1995 |
| 6,704,493 B1 | 3/2004 | Matthews et al. | GB | 2320637 | 6/1998 |
| 6,708,251 B1 | 3/2004 | Boyle et al. | GB | 2333017 | 7/1999 |
| 6,748,539 B1 | 6/2004 | Lotspiech | JP | 02-266774 | 10/1990 |
| 6,754,254 B2 | 6/2004 | Sendonaris | JP | 03-34685 | 2/1991 |
| 6,757,165 B2 | 6/2004 | Fujiki et al. | JP | 04088772 | 3/1992 |
| 6,766,956 B1 | 7/2004 | Boylan et al. | JP | 5-181803 | 7/1993 |
| 6,788,882 B1 | 9/2004 | Geer et al. | JP | 06233234 | 8/1994 |
| 6,829,254 B1 | 12/2004 | Rajahalme et al. | JP | 06245157 | 9/1994 |
| 6,865,431 B1 | 3/2005 | Hirota et al. | JP | H6-245182 | 9/1994 |
| 6,895,169 B1 | 5/2005 | Sprague | JP | 07264529 | 1/1995 |
| 6,925,246 B1 | 8/2005 | Behl | JP | H7-30839 | 1/1995 |
| 6,950,941 B1 | 9/2005 | Lee et al. | JP | 7-44907 | 2/1995 |
| 6,959,221 B1 | 10/2005 | Kataoka | JP | H7-44907 | 2/1995 |
| 6,985,584 B1 | 1/2006 | Yokota et al. | JP | 07111629 | 4/1995 |
| 6,993,567 B1 | 1/2006 | Yodo et al. | JP | 07131754 | 5/1995 |
| 7,032,177 B2 | 4/2006 | Novak et al. | JP | 07250305 | 9/1995 |
| 7,050,705 B1 | 5/2006 | Mori | JP | 8-279273 | 10/1996 |
| 7,055,166 B1 | 5/2006 | Logan et al. | JP | H8-289240 | 11/1996 |
| 7,137,011 B1 | 11/2006 | Harari et al. | JP | 09233415 | 5/1997 |
| 7,239,800 B2 | 7/2007 | Bilbrey | JP | 61-133089 | 7/1997 |
| 7,266,704 B2 | 9/2007 | Levy | JP | 10-56620 | 2/1998 |
| 7,272,298 B1 | 9/2007 | Lang et al. | JP | 11-203135 | 7/1999 |
| 7,346,582 B2 | 3/2008 | Sako et al. | JP | 2000-295560 | 10/2000 |
| 7,607,157 B1 | 10/2009 | Inoue et al. | WO | WO 91/03112 | 8/1990 |
| 7,877,765 B2 | 1/2011 | Bhogal et al. | WO | PCT/US92/04573 | 6/1992 |
| 2001/0003554 A1 | 6/2001 | Mori et al. | WO | WO 92/22983 | 6/1992 |
| 2001/0013120 A1 | 8/2001 | Tsukamoto | WO | WO 92/22983 | 12/1992 |
| 2002/0003949 A1 | 1/2002 | Mamiya et al. | WO | WO 93/16557 A1 | 8/1993 |
| 2002/0012531 A1 | 1/2002 | Flannery | WO | WO 94/17626 | 8/1994 |
| 2002/0017558 A1 | 2/2002 | Graves | WO | WO 95/33336 | 12/1995 |
| 2002/0028063 A1 | 3/2002 | Haneda et al. | WO | WO 97/15143 | 4/1997 |
| 2002/0056118 A1 | 5/2002 | Hunter et al. | WO | WO 98/48566 | 10/1998 |
| 2002/0057895 A1 | 5/2002 | Oku et al. | WO | WO 98/56188 | 12/1998 |
| 2002/0144265 A1 | 10/2002 | Connelly | WO | WO 99/38321 | 7/1999 |
| 2002/0164156 A1 | 11/2002 | Bilbrey | WO | WO 00/76130 | 5/2000 |
| 2002/0176690 A1 | 11/2002 | Nagasawa | WO | WO 00/33568 A1 | 6/2000 |
| 2002/0199043 A1 | 12/2002 | Yin | WO | WO 01/48755 | 7/2001 |
| 2003/0026589 A1 | 2/2003 | Barton et al. | WO | WO 01/53963 | 7/2001 |
| 2003/0040962 A1 | 2/2003 | Lewis | WO | WO 03/19932 | 3/2003 |
| 2003/0118014 A1 | 6/2003 | Iyer et al. | | | |
| 2003/0120942 A1 | 6/2003 | Yoshida et al. | | | |
| 2003/0215211 A1 | 11/2003 | Coffin, III | | | |
| 2004/0117483 A1 | 6/2004 | Singer et al. | | | |
| 2004/0193900 A1 | 9/2004 | Nair | | | |
| 2005/0025469 A1 | 2/2005 | Geer et al. | | | |
| 2005/0066362 A1 | 3/2005 | Rambo | | | |
| 2005/0122335 A1 | 6/2005 | MacInnis et al. | | | |
| 2005/0132418 A1 | 6/2005 | Barton et al. | | | |
| 2005/0226604 A1 | 10/2005 | Kawamura et al. | | | |
| 2006/0045470 A1 | 3/2006 | Poslinski et al. | | | |
| 2007/0157201 A1 | 7/2007 | Cordray et al. | | | |
| 2007/0166001 A1 | 7/2007 | Barton | | | |
| 2007/0230921 A1 | 10/2007 | Barton et al. | | | |
| 2008/0092168 A1 | 4/2008 | Logan et al. | | | |
| 2008/0288998 A1 | 11/2008 | Locket | | | |
| 2009/0136215 A1 | 5/2009 | Barton et al. | | | |
| 2009/0208185 A1 | 8/2009 | Barton | | | |
| 2010/0080529 A1 | 4/2010 | Barton et al. | | | |
| 2010/0226627 A1 | 9/2010 | Barton et al. | | | |
| 2011/0041146 A1 | 2/2011 | Lewis | | | |
| 2011/0126107 A1 | 5/2011 | Barton et al. | | | |

FOREIGN PATENT DOCUMENTS

| | | |
|---|---|---|
| DE | 3909334 A1 | 9/1990 |
| DE | 4201 031 C2 | 7/1993 |
| DE | 44 34 034 A1 | 3/1996 |
| EP | 0594241 | 10/1993 |
| EP | 0594241 B1 | 4/1994 |
| EP | 0 651 328 A1 | 5/1995 |
| EP | 0701371 A1 | 3/1996 |
| EP | 0726574 | 8/1996 |
| EP | 0766476 A2 | 9/1996 |
| EP | 0785675 | 1/1997 |
| EP | 0762756 A2 | 3/1997 |
| EP | 784400 | 7/1997 |
| EP | 0785675 | 7/1997 |
| EP | 0817483 | 1/1998 |

OTHER PUBLICATIONS

Office Action received in European application No. 07025136.8-1522, dated Nov. 18, 2011, 5 pages.

Claims as of Nov. 18, 2011 in European application No. 07025136. 8-1522, 4 pages.

Intellectual Property Library, "*Sitrick* Vs. *Dreamworks LLC*", (CAFC) 85 USPQ2d, 1826, revised Feb. 5, 2008, 9 pages.

Chinese Office Action received in Application No. 200580041645.9 dated Nov. 24, 2011 (9 pages).

Current Claims of Chinese Application No. 200580041645.9 dated Nov. 2011 (11 pages).

Exhibit A1 to AT&T's and Microsoft Corporation's Invalidity Contentions: Claim Chart of U.S. Patent No. 6,233,389 in view of U.S. Patent No. 5,557,724 to Sampat, 23 pages, May 21, 2010.

Exhibit A2 to AT&T's and Microsoft Corporation's Invalidity Contentions: Claim Chart of U.S. Patent No. 6,233,389 in view of U.S. Patent No. 6,169,843, 6 pages, May 21, 2010.

Exhibit A3 to AT&T's and Microsoft Corporation's Invalidity Contentions: Claim Chart of U.S. Patent No. 6,233,389 in view of U.S. Patent No. 6,181,706, 5 pages, May 21, 2010.

Exhibit A4 to AT&T's and Microsoft Corporation's Invalidity Contentions: Claim Chart of U.S. Patent No. 6,233,389 in view of U.S. Patent No. 7,272,298 to Lang, 11 pages, May 21, 2010.

Exhibit A5 to AT&T's and Microsoft Corporation's Invalidity Contentions: Claim Chart of U.S. Patent No. 6,233,389 in view of U.S. Patent No. 6,209,041, 140 pages, May 21, 2010.

Exhibit A6 to AT&T's and Microsoft Corporation's Invalidity Contentions: Claim Chart of U.S. Patent No. 6,233,389 in view of U.S. Patent No. 6,172,712, 137 pages, May 21, 2010.

Exhibit A7 to AT&T's and Microsoft Corporation's Invalidity Contentions: Claim Chart of U.S. Patent No. 6,233,389 in view of Graham Thomason, EP0594241, 136 pages, May 21, 2010.

Exhibit A8 to AT&T's and Microsoft Corporation's Invalidity Contentions: Claim Chart of U.S. Patent No. 6,233,389 in view of U.S. Patent No. 5,822,493, 161 pages, May 21, 2010.

Exhibit A9 to AT&T's and Microsoft Corporation's Invalidity Contentions: Claim Chart of U.S. Patent No. 6,233,389 in view of U.S. Patent No. 6,490,000, 134 pages, May 21, 2010.
Exhibit A10 to AT&T's and Microsoft Corporation's Invalidity Contentions: Claim Chart of U.S. Patent No. 6,233,389 in view of C. Hanna et al., Demultiplexer IC for MPEG2 Transport Streams, 138 pages, May 21, 2010.
Exhibit A11 to AT&T's and Microsoft Corporation's Invalidity Contentions: Claim Chart of U.S. Patent No. 6,233,389 in view of Robert Johnson, a Digital Television Sequence Store, 148 pages, May 21, 2010.
Exhibit A12 to AT&T's and Microsoft Corporation's Invalidity Contentions: Claim Chart of U.S. Patent No. 6,233,389 in view of U.S. Patent No. 5,721,815 to Ottesen, 18 pages, May 21, 2010.
Exhibit A13 to AT&T's and Microsoft Corporation's Invalidity Contentions: Claim Chart of U.S. Patent No. 6,233,389 in view of U.S. Patent No. 6,018,612 to Thomason, et al. and further in view of U.S. Patent No. 5,949,948 to Krause et al., 7 pages, May 21, 2010.
Exhibit A14 to AT&T's and Microsoft Corporation's Invalidity Contentions: Claim Chart of U.S. Patent No. 6,233,389 in view of U.S. Patent No. 6,018,612, and further in view of U.S. Patent No. 5,477,263 and U.S. Patent No. 6,169,843, 11 pages, May 21, 2010.
Exhibit A15 to AT&T's and Microsoft Corporation's Invalidity Contentions: Claim Chart of U.S. Patent No. 6,233,389 in view of "StreamObjects: Dynamically-Segmented Scalable Media Over the Internet" by Steven Niemczyk, 17 pages, May 21, 2010.
Exhibit A16 to AT&T's and Microsoft Corporation's Invalidity Contentions: Claim Chart of U.S. Patent No. 6,233,389 in view of "A Programming System for the Dynamic Manipulation of Temporally Sensitive Data" by Christopher J. Lindblad, 16 pages, May 21, 2010.
Exhibit A17 to AT&T's and Microsoft Corporation's Invalidity Contentions: Claim Chart of U.S. Patent No. 6,233,389 in view of "An Architecture for Networked Multimedia" by Jonathan C. Soo, 12 pages, May 21, 2010.
Exhibit A18 to AT&T's and Microsoft Corporation's Invalidity Contentions: Claim Chart of U.S. Patent No. 6,233,389 in view of "Design of a Storage and Retrieval Model for Multimedia Data" by Ruihong Wang, 11 pages, May 21, 2010.
Exhibit A19 to AT&T's and Microsoft Corporation's Invalidity Contentions: Claim Chart of U.S. Patent No. 6,233,389 in view of U.S. Patent No. 6,304,714 to Krause et al., 7 pages, May 21, 2010.
Exhibit A20 to AT&T's and Microsoft Corporation's Invalidity Contentions: Claim Chart of U.S. Patent No. 6,233,389 in view of U.S. Patent No. 5,990,881, 6 pages, May 21, 2010.
Exhibit A21 to AT&T's and Microsoft Corporation's Invalidity Contentions: Claim Chart of U.S. Patent No. 6,233,389 in view of U.S. Patent No. 5,898,695, 6 pages, May 21, 2010.
Exhibit A22 to AT&T's and Microsoft Corporation's Invalidity Contentions: Claim Chart of U.S. Patent No. 6,233,389 in view of "Developing Object-Oriented Multimedia Software" by Phillip Ackermann, 9 pages, May 21, 2010.
Exhibit A23 to AT&T's and Microsoft Corporation's Invalidity Contentions: Claim Chart of U.S. Patent No. 6,233,389 in view of U.S. DISHplayer 7100 System and U.S. Patent No. 6,490,000, 21 pages, May 21, 2010.
U.S. District Court for the Eastern District of Texas, Marshall Division, AT&T's and Microsoft Corporation's Invalidity Contentions, TiVo Inc. vs. AT&T Inc. and Microsoft Corporation, Case No. 2:09-CV-259-DF, 44 pages, May 21, 2010.
Ash, Robert "Real-Time Encoding and Feeds in Oracle Video Server" an Oracle white paper, Mar. 1998, 7 pages.
Dowden, John et al. "Oracle Video Server: Getting Started with Oracle Video Server Manager" release 3.0, Feb. 198, part No. A55979-02, 48 pages.
Hanna, C. et al. "Demultiplexer IC for MPEG2 Transport Streams" IEEE Transactions on Consumer Electronics, vol. 41, No. 3, Aug. 1995, pp. 699-706.
Kurioka, Tatsuya et al. "Television Homer Server for Integrated Services—Toward the Realization of ISDB 'Anytime' Services-" NHK Science and Technical Research Laboratories, Tokyo, Japan, Proceedings ISCE '97, IEEE International Symposium on consumer Electronics, pp. 250-253, 1997.

Lindblad, Christopher "A Programming System for the Dynamic Manipulation of Temporally Sensitive Data" MIT Laboratory for Computer Science, Aug. 1994, 275 pages.
Linden, Brian et al. "Oracle Video Server™: Introducing Oracle Video Server" release 3.0, Feb. 1998, part No. A53956-02, 78 pages.
McKendrick, Martin "Adding Video to Applications with the Oracle Video Server" an Oracle White Paper, Mar. 1998, 30 pages.
Minneman, Scott L. et al. "Where Were We: making and using near-synchronous, pre-narrative video" International Multimedia Conference, Proceedings of the first ACM International Conference on Multimedia 1993, pp. 207-214, (9 pages).
Niemczyk, Steven "StreamObjects: Dynamically-Segmented Scalable Media Over the Internet" submitted to the Department of Electrical Engineering and Computer Science, Massachusetts Institute of Technology, May 27, 1996, 90 pages.
Oracle Corporation "Video-Enhanced Web Services: Delivering Interactive Television and Switched Video Broadcast Services" an Oracle, Digital, Ericsson and Acorn White Paper, Mar. 1998, 11 pages.
Soo, Jonathan C. "An Architecture for Networked Multimedia" submitted to the Department of Electrical Engineering and Computer Science, Massachusetts Institute of Technology, May 30, 1995, 49 pages.
Tektronix PDR 100 Profile™ Video Disk Recorder 070-9042-02, User Manual, First printing: Feb. 1995, Revised: Aug. 1995, 156 pages.
Wang, Ruihong "Design of a Storage and Retrieval Model for Multimedia Data" Thesis, submitted to the School of Graduate Studies and Research, Ottawa-Carleton Institute of Electrical Engineering, 1994, 116 pages.
Oracle Corporation "Oracle Video Server™: Installation Guide" Release 3.0 for Sun SPARC Solaris 2.x, Feb. 1998, part No. A59554-01, 82 pages.
Dowden, John et al. Oracle Video Server™: Quick Start, Release 3.0, Feb. 1998, part No. A53954-02, 28 pages.
Oracle Corporation "Oracle Video Server™: Release Notes" Realease 3.0.4 for Sun SPARC Solaris 2.x. May 1998, part No. A53951-03, 34 pages.
Rosen, Daryl "Oracle Video Server System Technical Overview" An Oracle White Paper, Mar. 1998, 15 pages.
Engst, Adam "Quick Time" article originally appeared in TidBITS on Jul. 22, 1991 at 12:00 p.m., the permanent URL for the article is: http://db.tidbits.com/article/3441, 5 pages.
Brophy, Karen A. "SuperMac's JPEG-based DigitalFilm card could change the multimedia game" article from Infoworld, Aug. 9, 1993, p. 68.
Pugh, Jon "VideoSpigot Review" article originally appeared in TidBITS on Apr. 20,1992 at 12:00 p.m., the permanent URL for the article is: http://db.tidbits.com/article/3120, 3 pages.
Computergram "WebTV Networks Promises TV-Quality Video with VideoFlash", Jan. 20, 1997, article from www.cbronline.com, 1 page.
Coale, Kristi "WebTV Plus Raises the Stakes" Sep. 16, 1997, article URL is http://www.wired.com/print/science/discoveries/news/1997/09/6914, 2 pages.
Phillip Ackermann, excerpts including: the cover, pp. 66-69 and pp. 190-193 from the book entitled "Developing Object-Oriented Multimedia Software" copyright 1996 by dpunkt, 5 pages.
Loronix CCTVware Enterprise Product Brochure, 2 pages, 1995.
Loronix CCTVware Solo Product Brochure, 2 pages, 1995.
Australian Government, "Patent Examination Report No. 1", in application No. 20100202449, dated Jun. 28, 2012, 3 pages.
Current Claims application No. 20100202449, dated Jun. 2012, 3 pages.
U.S. Patent and Trademark Office, Ex Parte Reexamination Certificate, U.S. Patent No. 6,233,389, C1, issued Nov. 11, 2008.
U.S. Patent and Trademark Office, Ex Parte Reexamination Communication Transmittal Form, Notice of Intent to Issue Reexamination Certificate, dated Nov. 28, 2007.
Order Granting Request for Ex Parte Reexamination, U.S. Patent No. 6,233,389, Control No. 90/009,329, mailed Jan. 7, 2009.
Peuker, Thomas, "An Object-Oriented Architecture for the Real-Time Transmission of Multimedia Data Streams", Institute für Mathematische Maschinen and Datenverarbeitung (Informatik) IV, Lehrstul für Betriebssyteme Universität Erlangen-Nürnberg, Erlangen, Mar. 17, 1997.

Mayer-Patel, Ketan et al., "Synchronized Continuous Media Playback Through the World Wide Web", U.C. Berkeley, Computer Science Division, Berkeley Multimedia Research Center, Published:1996, Berkeley, CA.

Chatterjee, Amit et al., "Microsoft DirectShow: A New Media Architecture", SMPTE Journal, pp. 865-871, Dec. 1997.

Fung, Chi-Leung et al., "MOCS: an Object-Oriented Programming Model for Multimedia Object Communication and Synchronization", Department of Computer Science, The Hong Kong University of Science and Technology, Clear Water Bay, Kowloon, Hong Kong, 1994 IEEE.

Gibbs, Simon, "Composite Multimedia and Active Objects", Centre Universitaire d''Informatique, Université de Genève, Proc. OOPSLA '91, 1991.

European Patent Office, Communication dated Feb. 5, 2009, in European Patent Application No. 1 729 515, Notice of Opposition, Brunner/Williamson opponents.

European Patent Office "Communication pursuant to Article 94(e) EPC", Foreign application No. 02 796 373.5-1522, received Jan. 25, 2008.

European Patent Office "Communication pursuant to Article 94(e) EPC", Foreign application No. 02 796 373.5-1522, received Jun. 15, 2007.

European Patent Office, Notice of Opposition, European Application No. EP 1 729 515, Interressensgemeinschaft fur Rundfunkschutzrechte., opponent, dated Jan. 23, 2009.

U.S. District Court for the Eastern District of Texas, Marshall Division, Claim Construction Order, *Tivo Inc.* v. *Echostar Communications Corp. et al.*, Case No. 2:04-CV-1-DF, Aug. 18, 2005.

U.S. District Court for the Eastern District of Texas, Marshall Division, Final Judgment and Permanent Injunction, *Tivo Inc.* v. *Echostar Communications Corp. et al.*, Case No. 2:04-CV-1-DF, Aug. 17, 2006.

U.S. Court of Appeals for the Federal Circuit, *TiVo Inc.* v. *Echostar Communications Corp.* et al., Decision, Case No. 2006-1574, Decided: Jan. 31, 2008.

Harrick M. Vin, et al., *Designing a Multiuser HDTV Storage Server*, IEEE Journal, vol. 11, No. 1, Jan. 1993 (pp. 153-164).

Quantum Fireball 640/1280S Product Manual, Quantum®, Copyright © 1995 by Quantum Corporation (190 pgs).

Hewlett Packard® MPEGscope Startup Guide, Hewlett Packard Company © 1997-2000 (39 pgs).

Hewlett Packard® MPEGscope User's Guide, Hewlett Packard Company © 1997-2000 (282 pgs).

DiviCom, MP100 User Guide, DiviCom, Inc., © 1996 (97 pgs).

Offiical Action from EPO for foreign patent application No. 999098676-2202 dated Dec. 27, 2005 (5 pgs).

Current Claims in EPO patent application No. 99909867.6-2202 (9 pgs.), Dec. 2005.

Inside Macintosh "QuickTime", Apple Technology Library by Apple Computer, Inc., © 1993 (published by Addison-Wesley Publishing Company) 719 pgs.

Inside Macintosh "Files", Apple Technology Library by Apple Computer, Inc., © 1992 (published by Addison-Wesley Publishing Company) 532 pgs.

Inside Macintosh "Memory", Apple Technology Library by Apple Computer, Inc., © 1992 (published by Addison-Wesley Publishing Company) 303 pgs.

Inside Macintosh "QuickTime Components", Apple Technology Library by Apple Computer, Inc., © 1993 (published by Addison-Wesley Publishing Company) 828 pgs.

Inside Macintosh "Overview", Apple Technology Library by Apple Computer, Inc., © 1992 (published by Addison-Wesley Publishing Company) 251 pgs.

Quantum Q500 Series High Capacity 5 ¼" Fixed Disk Drive, Quantum Corporation, © 1983 (2 pgs).

Quantum 2000 Series Low-Cost 8' Fixed Disk Drives, "New DC Motor Option", Quantum Corporation (2 pgs).

Quantum Q2080 Low-Cost, 85 Megabyte Fixed Disk Drive, "85 Mb capacity/40ms average access time", Quantum Corporation, © 1982 (2 pgs).

OEM Interface Specifications for DSAA-3xxx, 3.5-Inch Hard Disk Drive with ATA Interface, IBM Corporation, © 1994 (65 pgs).

International Standard ISO/IEC 11172-2:1993(E), (Part 2: Video), Downloaded Jun. 15, 2005 (136 pgs).

International Standard ISO/IEC 11171-3:1993/Cor.1:1996(E), (Part 3: Audio), Downloaded Jun. 15, 2005 (159 pgs).

Guide to VAX/VMS File Applications, Software Version VAX/VMS Version 4.0, Sep. 1984 (19 pgs).

Jim Stratigos et al., Media4 Press Release "Announces Reseller Agreement with AlphaStar Television Networks", Microsoft® and Windows® 95 (3 pgs).

Jim Stratigos et al., Media4 Press Release "Announces Multimedia Satellite Network for Personal Computers", Microsoft® and Windows® 95 (3 pgs).

Media Stream, "Satellite Receiver" Installation and Users Guide for Windows 95, Media4, Inc., © 1996 (33 pgs).

International Standard ISO/IEC 13818-1:2000(E) "Information Technology—Generic Coding of Moving Pictures and Associated Audio Information: Systems", © ISO/IEC 2000, Downloaded Jun. 30, 2005 (173 pgs).

International Standard ISO/IEC 13818-1:2000/Amd.2:2004(E) "Information Technology—Generic Coding of Moving Pictures and Associated Audio Information: Systems", Amendment 2: Support of IPMP on MPEG-2 Systems, © ISO/IEC 2004, Downloaded Jun. 30, 2005 (13 pgs).

International Standard ISO/IEC 13818-2:2000(E) "Information Technology—Generic Coding of Moving Pictures and Associated Audio Information: Video", © ISO/IEC 2000, Downloaded Jun. 30, 2005 (219 pgs).

International Standard ISO/IEC 13818-3:1998(E) "Information Technology—Generic Coding of Moving Pictures and Associated Audio Information: Audio", © ISO/IEC 1998 (125 pgs).

Winston Hodge, et al., "Chapter 7, *True Video on Demand vs. Near Video on Demand*", delivered at National Cable Television Conference, May 24, 1994 (pp. 103-120).

Cyril U. Orji, et al., "*Design and Configuration Rationales for Digital Video Storage and Delivery Systems*", Multimedia Tools and Applications, 9, 275-302 (1992), © 1992 Kluwer Academic Publishers, Boston (pp. 275-302).

R. Johnston, et al., "*A Digital Television Sequence Store*", IEEE, (pp. 594-600) © 1978.

M. Hausdorfer, "*Symposium Record Broadcast Sessions*", HDTV Production: Today and Tomorrow, Jun. 17, 1989, (7 pgs).

S. Berson, "*Computer Science Department Technical Report*", Staggered Striping in Multimedia Information System, Dec. 1993, Apr. 29, 1994, (24 pgs).

Conner Filepro Performance Series, CFP1060E/CFP1060S/CFP1060W, "*Intelligent Disk Drive Product Manual*", Rev. A, May 1994, © 1994, Conner Peripherals, Inc., (79 pgs).

Hugh M. Sierra, "*An Introduction to Direct Access Storage Devices*", © 1990 by Academic Press, Inc., (269 pgs).

Douglas T. Anderson, "*The Hard Disk Technical Guide*", Tenth Revision S-D., Feb. 1994, © 1990, 1991, 1992, 1993, 1994 by Micro House International Inc., (70 pgs).

Official Action from CN for foreign patent application No. 02816471.1 dated Oct. 21, 2005 (5 pgs).

K. Shen et al., *A Fast Algorithm for Video Parsing Using MPEG Compressed Sequences*, IEEE, pp. 252-255 (0-8185-7310-9/626/1995).

S. Smollar et al., *Content-based Video Indexing and Retrieval*, IEEE, Summer 1994, pp. 62-72.

J. Meng et al., *CVEPS—A Compressed Video Editing and Parsing System*, ACM Multimedia '96, Boston MA, pp. 43-53 (ACM 0-89791-671-1/96/1).

Official Action from EPO for foreign patent application No. 99 909 867.6-2202 dated Dec. 27, 2005 (5 pgs)—attached.

Office Action from CN for foreign patent application No. 200410056388.3 dated Nov. 25, 2005 (15 pgs).

U.S. District Court for the Eastern District of Texas, Marshall Division, Amended Final Judgment and Permanent Injunction, *Tivo Inc.* v. *Echostar Communications Corp. et al.*, Case No. 2:04-CV-1-DF, Jun. 2, 2009.

U.S. District Court for the Eastern District of Texas, Marshall Division, Memorandum Opinion, *Tivo Inc.* v. *Echostar Communications Corp. et al.*, Case No. 2:04-CV-1-DF, Jun. 2, 2009.

Petition of Patent Owner to Vacate Order Granting Second Reexamination Request, U.S. Patent No. 6,233,389, Control No. 90/009,329, filed May 27, 2009.

Petition of Patent Owner to Temporarily Suspend Ex Parte Reexamination Proceeding, U.S. Patent No. 6,233,389, Control No. 90/009,329, filed May 27, 2009.

Astarte DVDirector Beta Testing Program, Jul. 1998.

H. Zhang et al., Video parsing, retrieval and browsing: an integrated and content-based solution, ACM Multimedia 95—Electronic Proceedings (Nov. 5-9, 1995, San Francisco, CA.

Ramanathan et al., "Toward personalized multimedia dial-up services," Computer Networks and ISDN Systems Jul. 26, 1994, No. 10, Amsterdam NL.

Fuji et al., "Implementation of MPEG Transport Demultiplexer with a RISC-Based Microcontroller", IEEE, 1996.

Macweek News article entitled "Quick Time Ready for Prime Time", dated Dec. 10, 1991 (2 pages).

Hewlett Packard Laboratories Technical Report entitled "UNIX Disk Access Patterns", by Chris Ruemmler and John Wildes, HPL-92-152, dated Dec. 1992 (pp. 405-420), Hewlett-Packard Company, 1992.

J.M. Harker Et Al., "A Quarter Century of Disk File Innovation," IBM J. Res. Develop., vol. 25, No. 5, Sep. 1981, pp. 677-690.

A.D. Hospodor, "The Effect of Prefetch in SCSA Disk Drive Cache Buffers," Doctoral Thesis, Santa Clara University, May 2, 1994.

D.J. Woodham, "HDTV Production: Today and Tomorrow: A Solid State "Action Relay" Recorder", Symposium Record Broadcast Sessions, System Session P-2, dated Jun. 17, 1989 (8 pgs.).

U.S. District Court for the Eastern District of Texas, Marshall Division, Complaint for Patent Infringement and Jury Demand, *Tivo Inc.* v. *AT&T Inc.*, Case No. 2:09-cv-259, Aug. 26, 2009.

U.S. District Court for the Eastern District of Texas, Marshall Division, Complaint for Patent Infringement and Jury Demand, *Tivo Inc.* v. *Verizon Communications, Inc.*, Case No. 2:09-cv-257, Aug. 26, 2009.

Japanese Application 2003524253, Office Action dated Oct. 19, 2005.

European Application No. 06019602.9, Office Action dated Jan. 10, 2007.

European Application No. 06019602.9, Search Report dated Nov. 6, 2006.

Decision on Petition of Patent Owner to Temporarily Suspend Ex Parte Reexamination Proceeding, U.S. Patent No. 6,233,389, Control No. 90/009,329, mailed Sep. 14, 2009.

Non-final Office Action in Reexamination Proceeding, U.S. Patent No. 6,233,389, Control No. 90/009,329, mailed Aug. 3, 2009.

Decision on Petition of Patent Owner to Temporarily Suspend Ex Parte Reexamination Proceeding, U.S. Patent No. 6,233,389, Control No. 90/009,329, mailed Aug. 21, 2009.

Leek, Matthew R., et al., "MPEG Q&A (Moving Pictures Expert Group Digital Video Compression Standard")", CD-ROM Professional, v7, n4, p41, Jul.-Aug. 1994.

Ceccarelli, M et al., "A sequence analysis system for video databases," Time-Varying Image Processing and Moving Object Recognition 4, Elsevier Science B.V., pp. 133-138, 1997.

Hanjalic et al., "Automation of systems enabling search on stored video data," SPIE/IS&T Electronic Imaging '97, vol. 3022, pp. 427-438, Jan. 15, 1997.

DMA, published in Embedded Systems Programming, 4 pages, Oct. 1994.

"New Graphics Enhancements Will Be on Display at NAB (National Association of Broadcasters) Exhibition", Broadcasting v118, n11, p57, Mar. 12, 1990.

"Next Video Recorder—Tape or Disc?", Consumer Electronics, v33, n8, Feb. 22, 1993.

McLarnon, Zed et al., "Digital Image Meets Digital Audio; Sync Problems Faced by Multimedia Producer Now", Advanced Imaging, v9, n1, p62, Jan. 1994.

Nelson, Lee J. "The Latest in Compression Hardware & Software (Product Survey)", Advanced Imaging, v9, n1, p56, Jan. 1995.

European Patent Office, Application No. 07025136.8-1522, Office Action dated Mar. 30, 2009.

European Patent Office, Application No. 07025136.8-1522, current claims as of Mar. 30, 2009.

Office Action received in European application No. 11182065.0 dated Dec. 16, 2011 (9 pages).

Current Claims of European application No. 11182065.0 dated Dec. 2011 (3 pages).

U.S. District Court for the Eastern District of Texas, Marshall Division, Tivo's and Verizon Communications Inc., Verizon Service Corp. and Verizon Corporation Resources Group LLC Invalidity Contentions, *TiVo Inc.* vs. *Verizon Communications Inc.* Case No. 2:09-CV-257-DF, 44 pages, Apr. 2010.

\* cited by examiner

MULTIMEDIA SIGNAL PROCESSING SYSTEM

CROSS REFERENCE TO RELATED APPLICATIONS

This application is a Continuation of U.S. patent application Ser. No. 09/935,426, filed Aug. 22, 2001, which claims benefit of U.S. Provisional Patent Application Ser. No. 60/226,856, filed on Aug. 22, 2000, and said U.S. patent application Ser. No. 09/935,426 is a continuation-in-part of U.S. patent application Ser. No. 09/827,029, filed on Apr. 5, 2001, which is a continuation of U.S. patent application Ser. No. 09/126,071, filed Jul. 30, 1998, now U.S. Pat. No. 6,233,389, issued May 15, 2001, the entire contents of the foregoing are hereby incorporated by reference as if fully set forth herein, under 35 U.S.C. §120.

The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Technical Field

The invention relates to the time shifting of television broadcast signals. More particularly, the invention relates to the real time capture, storage, and display of television broadcast signals.

2. Description of the Prior Art

The Video Cassette Recorder (VCR) has changed the lives of television (TV) viewers throughout the world. The VCR has offered viewers the flexibility to time-shift TV programs to match their lifestyles.

The viewer stores TV programs onto magnetic tape using the VCR. The VCR gives the viewer the ability to play, rewind, fast-forward and pause the stored program material. These functions enable the viewer to pause the program playback whenever he desires, fast forward through unwanted program material or commercials, and to replay favorite scenes. However, a VCR cannot both capture and play back information at the same time.

One approach to solving this problem is to use several VCRs. For example, if two video tape recorders are available, it might be possible to Ping-Pong between the two. In this case, the first recorder is started at the beginning of the program of interest. If the viewer wishes to rewind the broadcast, the second recorder begins recording, while the first recorder is halted, rewound to the appropriate place, and playback initiated. However, at least a third video tape recorder is required if the viewer wishes to fast forward to some point in time after the initial rewind was requested. In this case, the third recorder starts recording the broadcast stream while the second is halted and rewound to the appropriate position. Continuing this exercise, one can quickly see that the equipment becomes unwieldy, unreliable, expensive, and hard to operate, while never supporting all desired functions. In addition, tapes are of finite length, and may potentially end at inconvenient times, drastically lowering the value of the solution.

The use of digital computer systems to solve this problem has been suggested. U.S. Pat. No. 5,371,551 issued to Logan et al., on 6 Dec. 1994, teaches a method for concurrent video recording and playback. It presents a microprocessor controlled broadcast and playback device. Said device compresses and stores video data onto a hard disk. However, this approach is difficult to implement because the processor requirements for keeping up with the high video rates makes the device expensive and problematic. The microprocessor must be extremely fast to keep up with the incoming and outgoing video data.

It would be advantageous to provide a multimedia signal processing system that gives the user the ability to simultaneously record and play back TV broadcast programs. It would further be advantageous to provide a multimedia signal processing system that utilizes an approach that decouples the microprocessor from the high video data rates, thereby reducing the microprocessor and system requirements, which are at a premium.

DETAILED DESCRIPTION OF THE INVENTION

The invention is embodied in a multimedia signal processing system. A system according to the invention provides a multimedia storage and display system that allows the user to view a television broadcast program with the option of instantly reviewing previous scenes within the program. The invention additionally provides the user with the ability to store selected television broadcast programs while simultaneously watching or reviewing another program and to view stored programs with at least the following functions: reverse, fast forward, play, pause, index, fast/slow reverse play, and fast/slow play.

Figure 1:
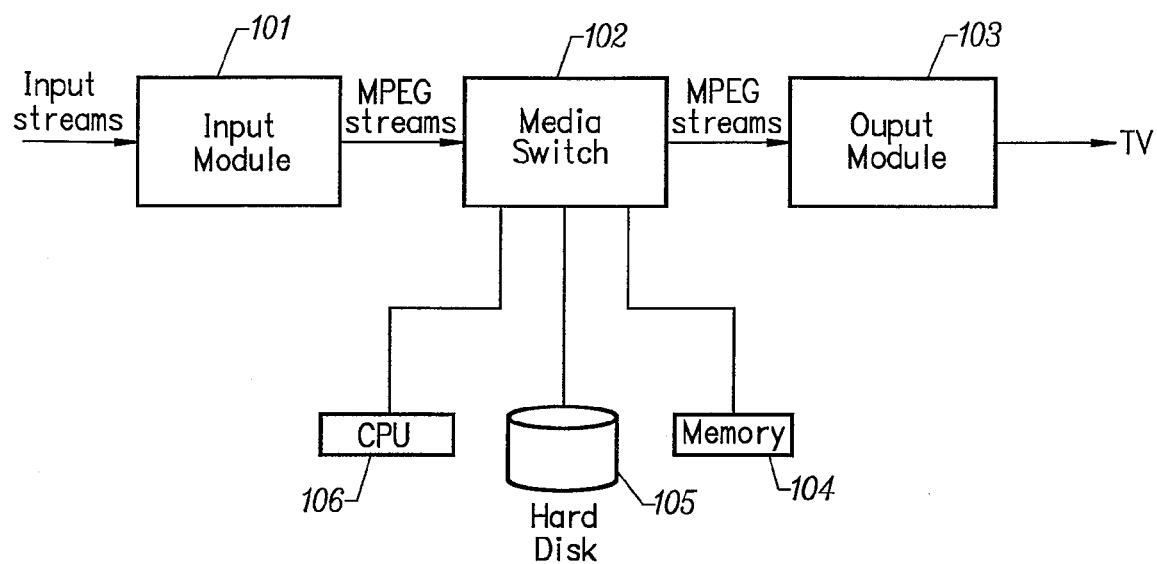
FIG. 1 is a block schematic diagram of a high level view of a preferred embodiment of the invention according to the invention.

Referring to FIG. 1, a preferred embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other sections as if they were delivered via an MPEG2 private data channel.

The Media Switch 102 mediates between a microprocessor CPU 106, hard disk or storage device 105, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 contains an MPEG decoder, On-Screen Display (OSD) generator, analog TV encoder and audio logic. The OSD generator allows the program logic to supply images which will be overlaid on top of the resulting analog TV signal. Additionally, the Output Section can modulate information supplied by the program logic onto the VBI of the output signal in a number of standard formats, including NABTS, CC and EDS.

Figure 2:
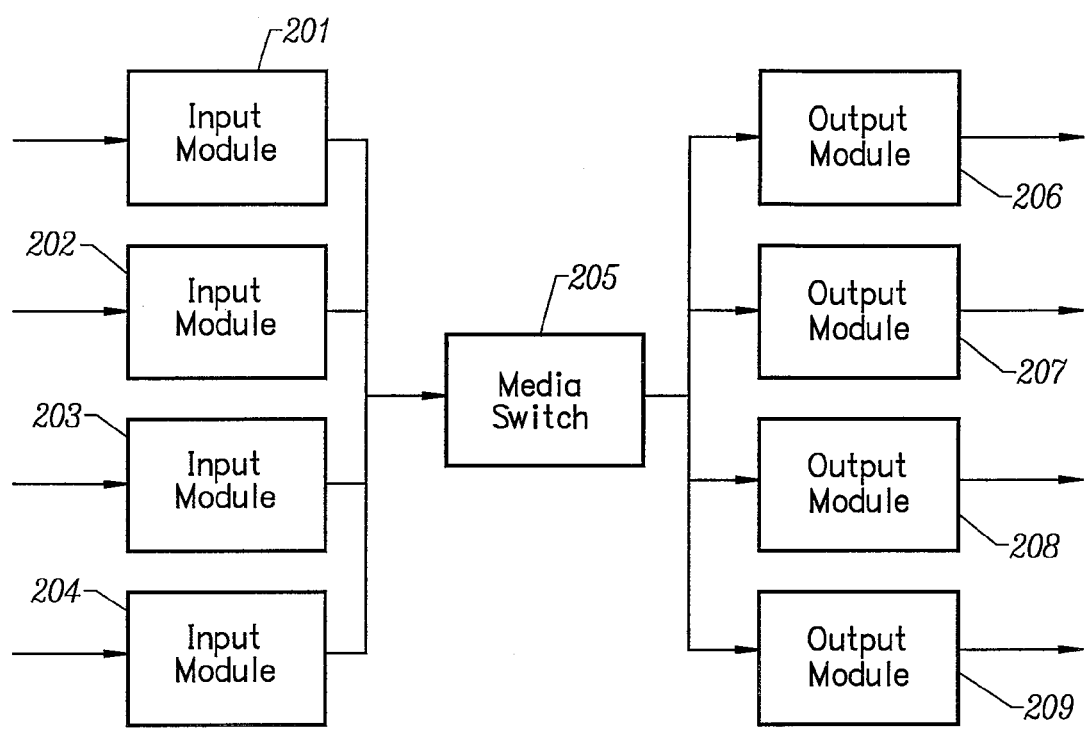
FIG. 2 is a block schematic diagram of a preferred embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
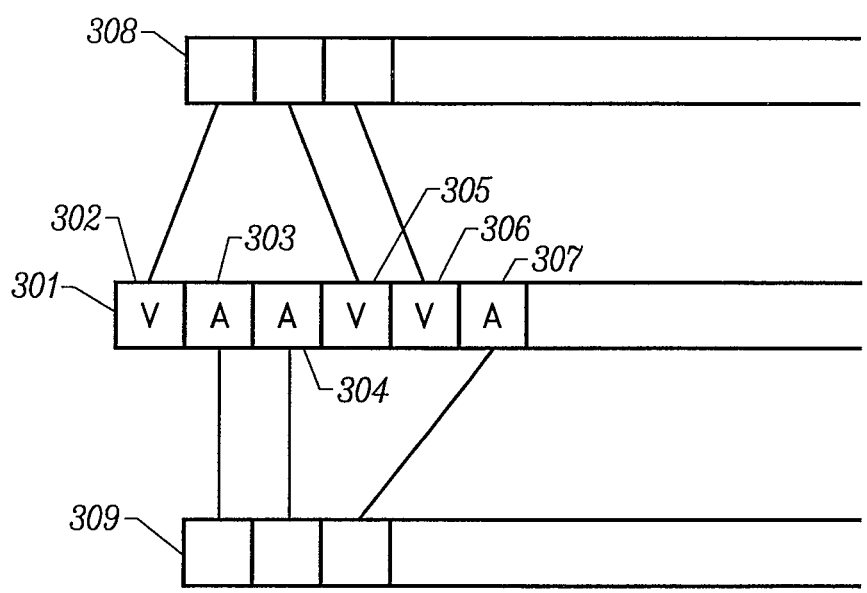
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform timestamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
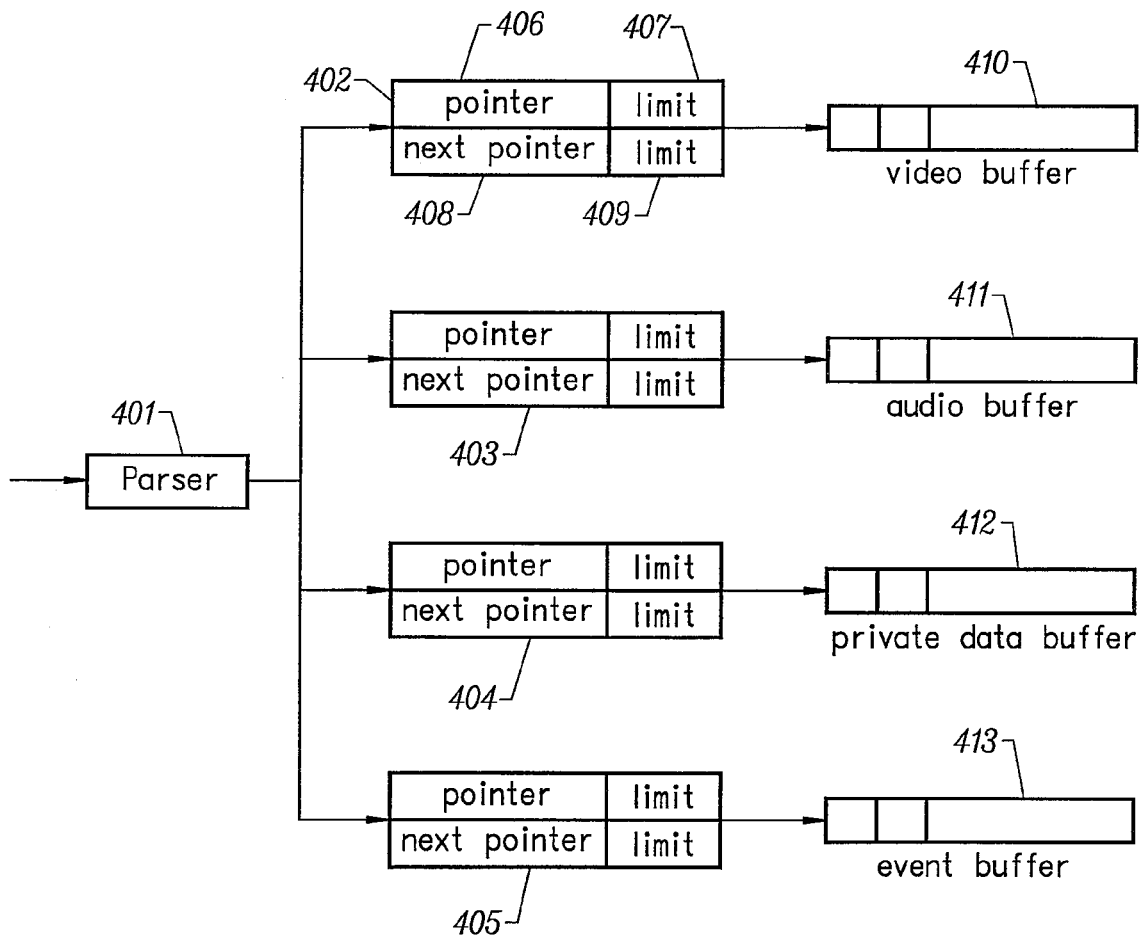
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
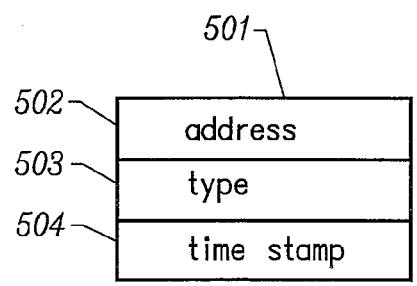
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
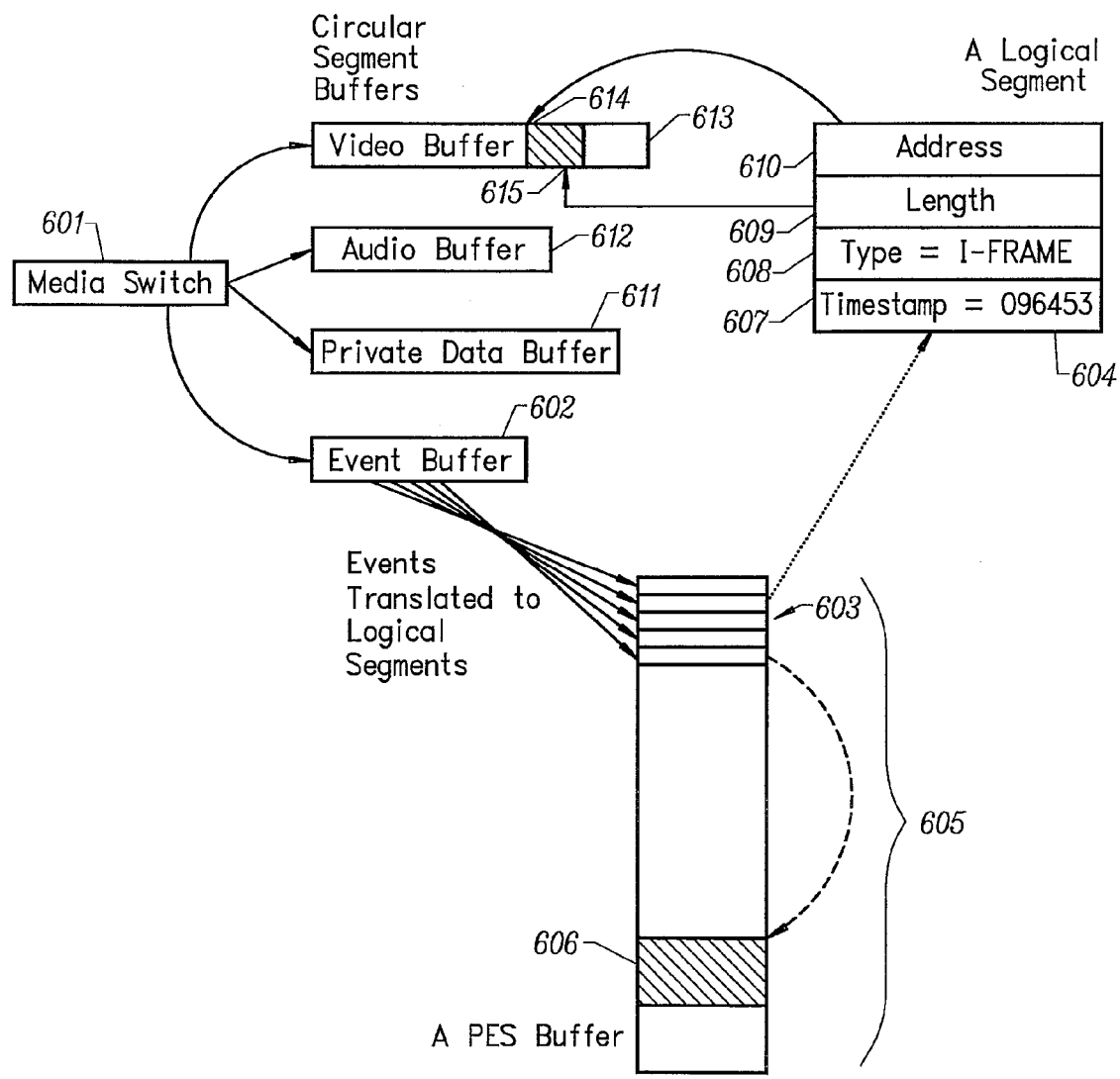
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment timestamp 607. In the case of a digital TV stream, PTS values are already encoded in the stream. The program logic extracts this information and places it in the logical segment timestamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk, and extracting video and audio data from the disk on a low cost platform. Generally, the Media Switch runs asynchronously and autonomously with the microprocessor CPU, using its DMA capabilities to move large quantities of information with minimal intervention by the CPU.

Figure 7:
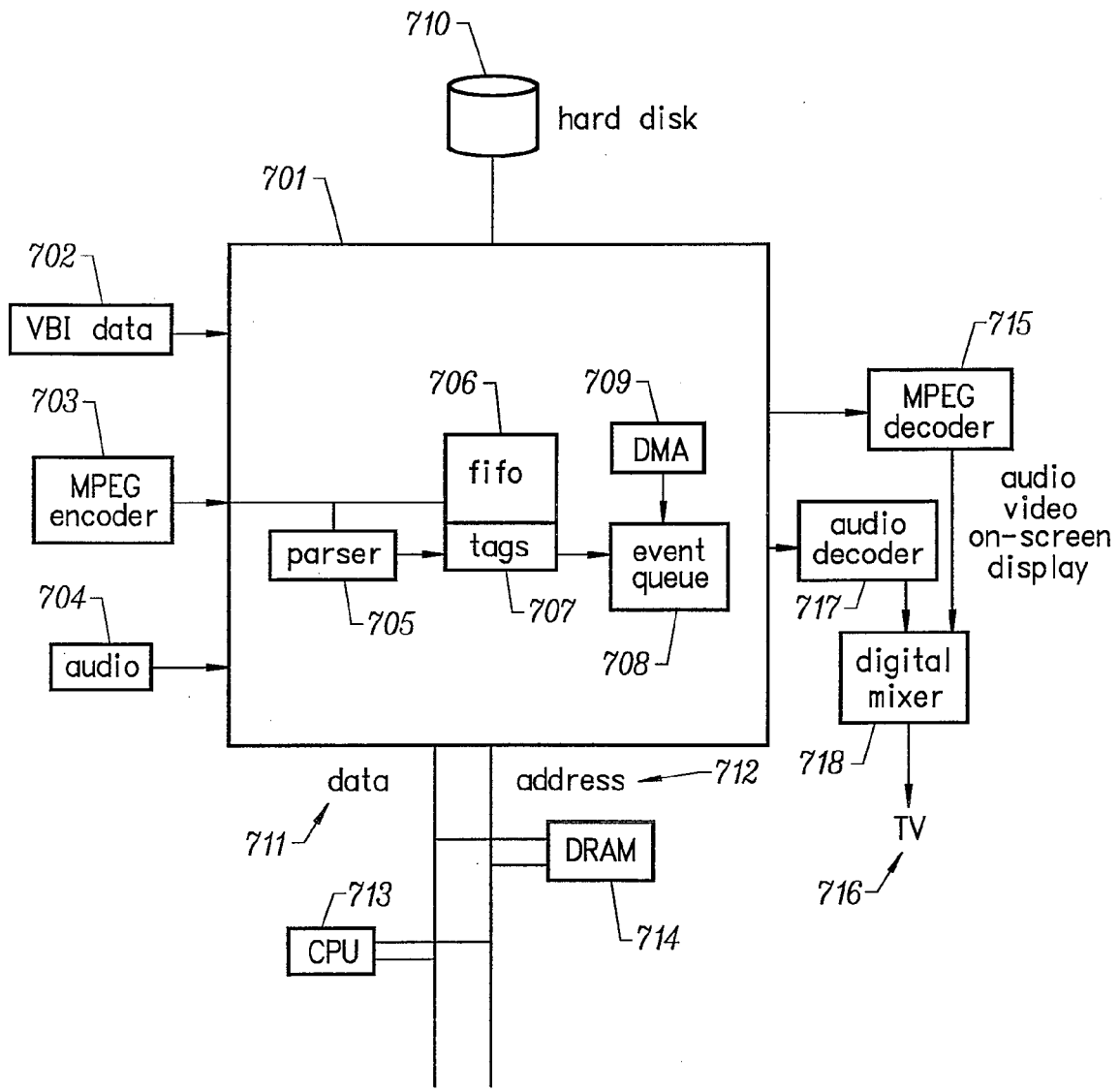
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence header—all of the pieces of information that the program logic needs to know about in order to both properly play back and perform special effects on the stream, e.g. fast forward, reverse, play, pause, fast/slow play, indexing, and fast/slow reverse play.

The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on-screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower clock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal, however sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

Figure 8:
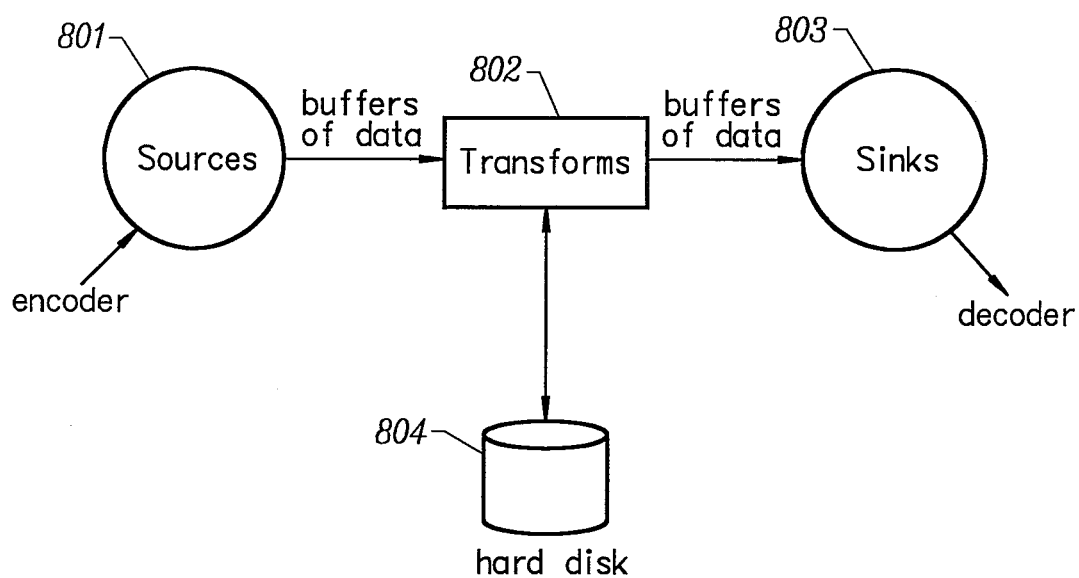
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

Figure 9:
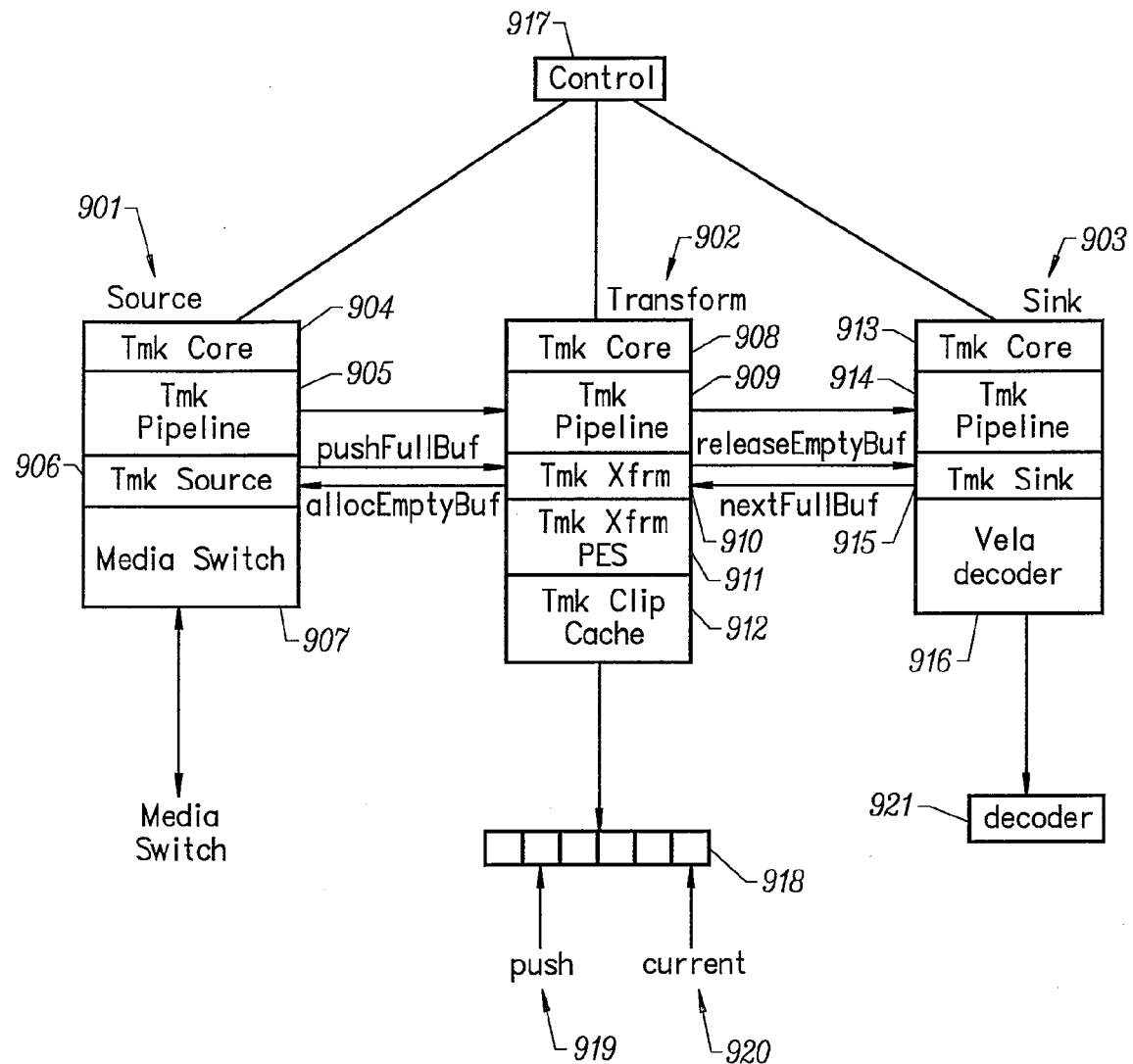
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXform 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it. It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer scheme can be implemented using a memory pool where each buffer is allocated on demand by a memory manager. The buffers are linked together by next buff pointers in a linked list 918. As buffers are released, they a freed back into the memory pool and are available to be allocated to other classes or tasks within the system. The push pointer 919 points to the last buffer in the linked list while the current pointer 920 points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902, that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
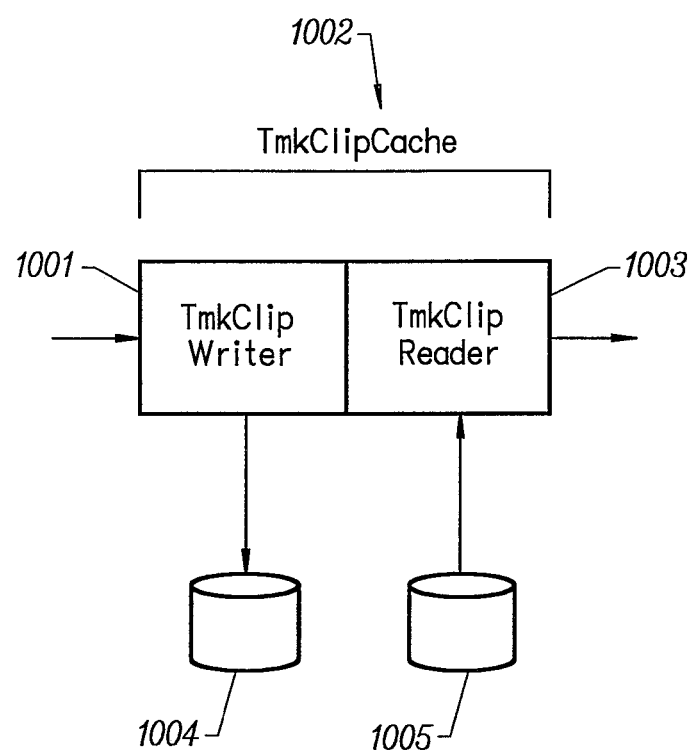
FIG. 10 is a block schematic diagram of a preferred embodiment of the clip cache component of the invention according to the invention.

With respect to FIG. 10, two other objects derived from the TmkXform class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
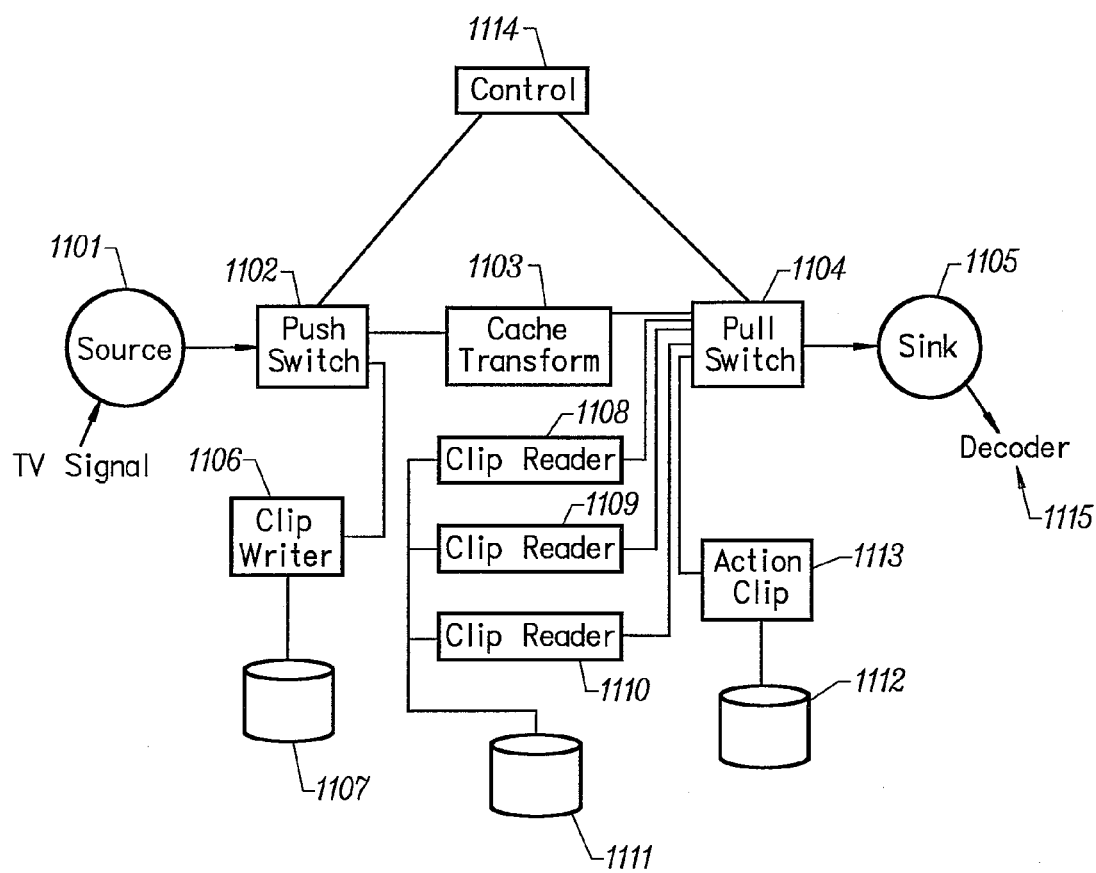
FIG. 11 is a block schematic diagram of a preferred embodiment of the invention that emulates a broadcast studio video mixer according to the invention.

Referring to FIG. 11, a preferred embodiment that accomplishes multiple functions is shown. A source 1101 has a TV signal input. The source sends data to a PushSwitch 1102 which is a transform derived from TmkXform. The Push-Switch 1102 has multiple outputs that can be switched by the control object 1114. This means that one part of the pipeline can be stopped and another can be started at the user's whim. The user can switch to different storage devices. The Push-Switch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time. This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
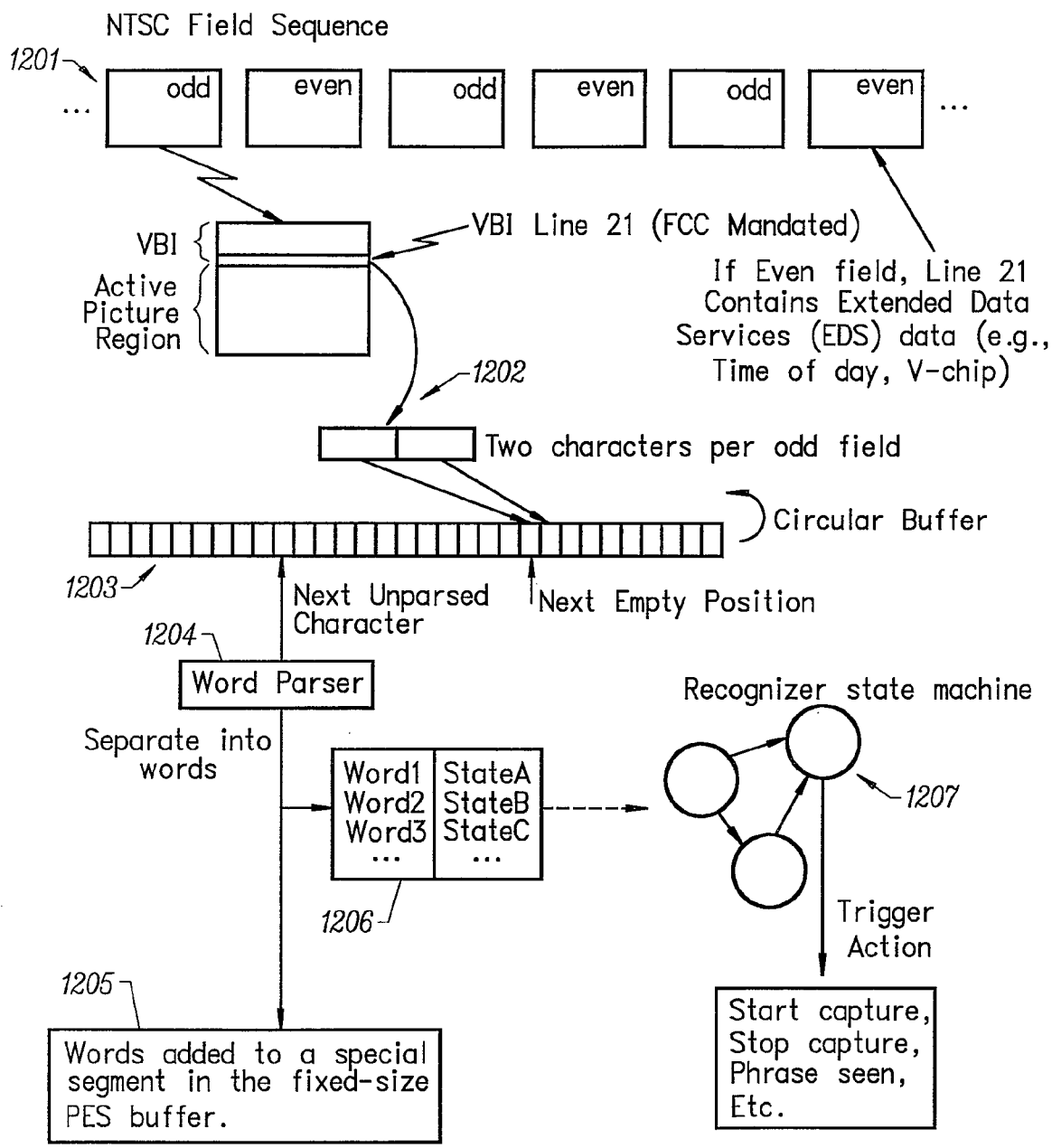
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer or linked list (using a memory allocation scheme as described above) 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

One skilled in the art will readily appreciate that although a circular buffer is specifically mentioned in areas above, a linked list using a memory pool allocation scheme, also described above, can be substituted in its place.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105. The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkXform object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
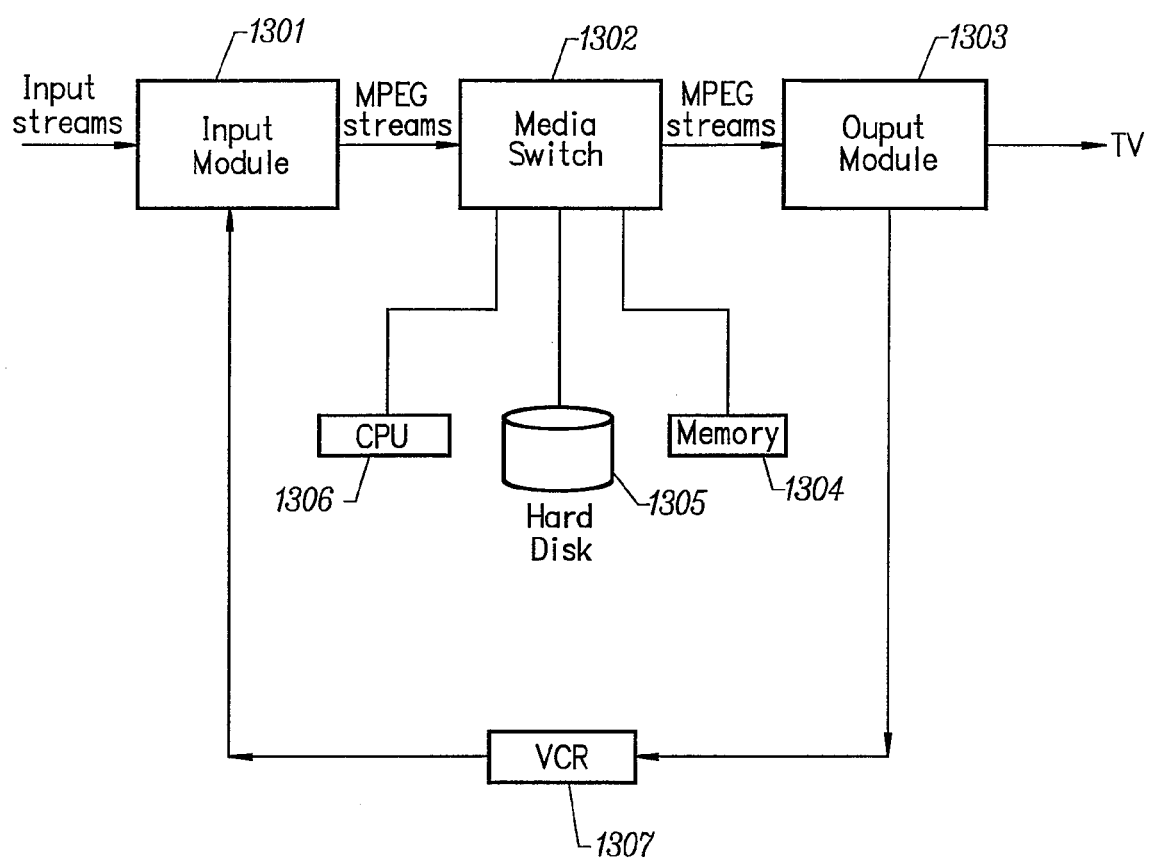
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

One skilled in the art will readily appreciate that such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, one skilled in the art will readily appreciate that although a VCR is specifically mentioned above, any multimedia recording device (e.g., a Digital Video Disk-Random Access Memory (DVD-RAM) recorder) is easily substituted in its place.

Figure 14:
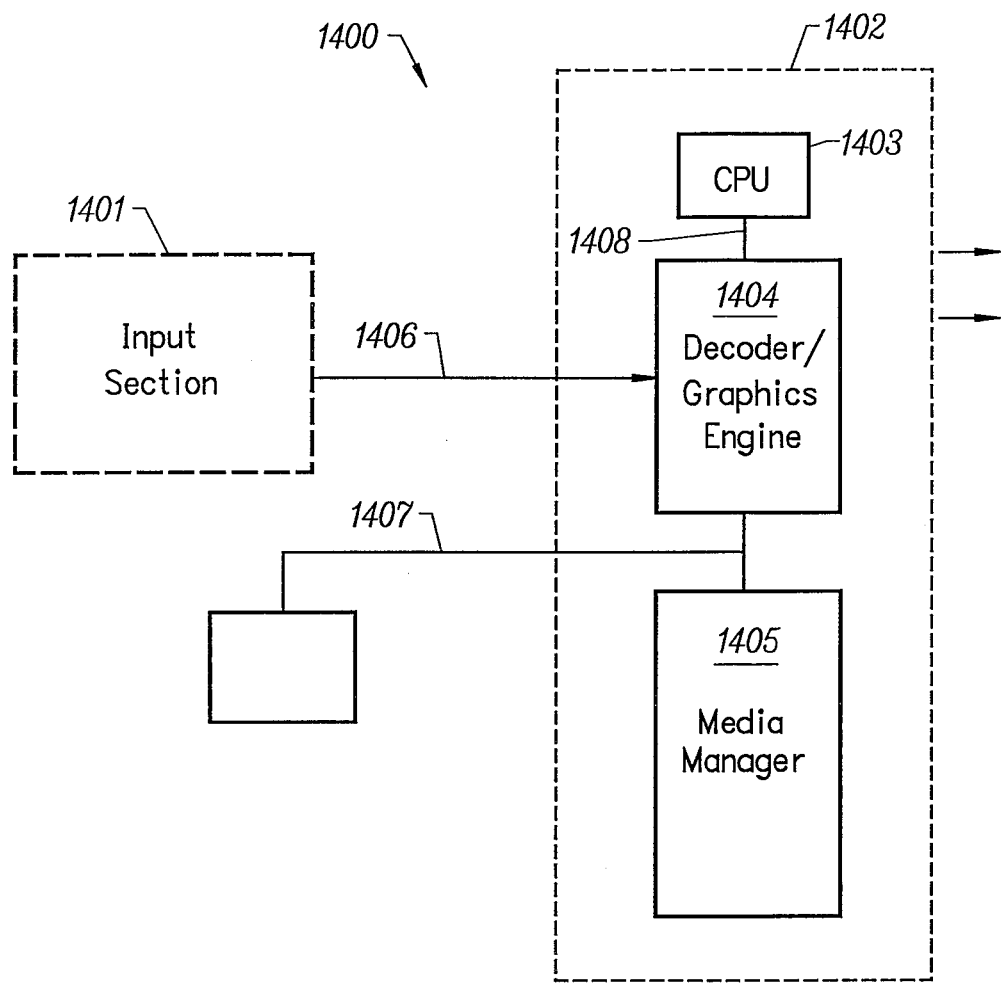
FIG. 14 is a block schematic diagram of a high level view of a system architecture according to the invention.

Turning now to FIG. 14, a schematic block diagram of a top-level view of the invented system architecture is provided. In general, a system board 1400 embodying the invention includes an input section 1401 that accepts an input signal from one of a variety of sources. As described below, the input section 1401 is provided in different versions, each adapted to accept input from a different source. The output section 1402 includes a CPU 1403, which largely functions to initialize and control operation of the various hardware components of the invention. As mentioned above, the CPU is decoupled from the high data rates of the video signal, thus reducing processor requirements. An MPEG-2 transport stream decoder/graphics subsystem 1404 accepts a transport stream delivered from the input section 1401 over a transport stream interface 1406. The transport stream decoder/graphics subsystem 1404 communicates with the CPU 1403 by means of a host bus 1408. While the transport stream decoder/graphics subsystem serves a variety of functions, described in detail below, its primary function is decoding of the transport stream received from the input section, and outputting the decoded stream as a video signal to a television set (not shown).

The output section further includes a media manager 1405. While the media manager provides a number of functions, its major function is that of a bridging element between system components, due to the number and type of I/O functions it incorporates. For example, the media manager includes an IR receiver/transmitter interface to couple with the handheld remote control by which a user operates the invention. Furthermore, the media manager serves an important media processing function. As previously indicated, the transport signal is both routed to the MPEG-2 decoder and saved to the storage device by the media manager. The media manager 1405 communicates with the MPEG-2 transport stream decoder/graphics subsystem 1404 by means of a system bus 1407. A preferred embodiment of the invention uses a PCI bus as the system bus. Advantageously, the output section is partitioned as three discrete chips: the CPU, the MPEG-2 decoder/graphics subsystem and the media manager. The simplicity of this partitioning arrangement enables a substantially reduced per-unit cost by dramatically reducing the time and budget required for initial design and development. Additionally, those skilled in the art will appreciate that the output section may also be provided as a single chip or chipset.

Figure 15:
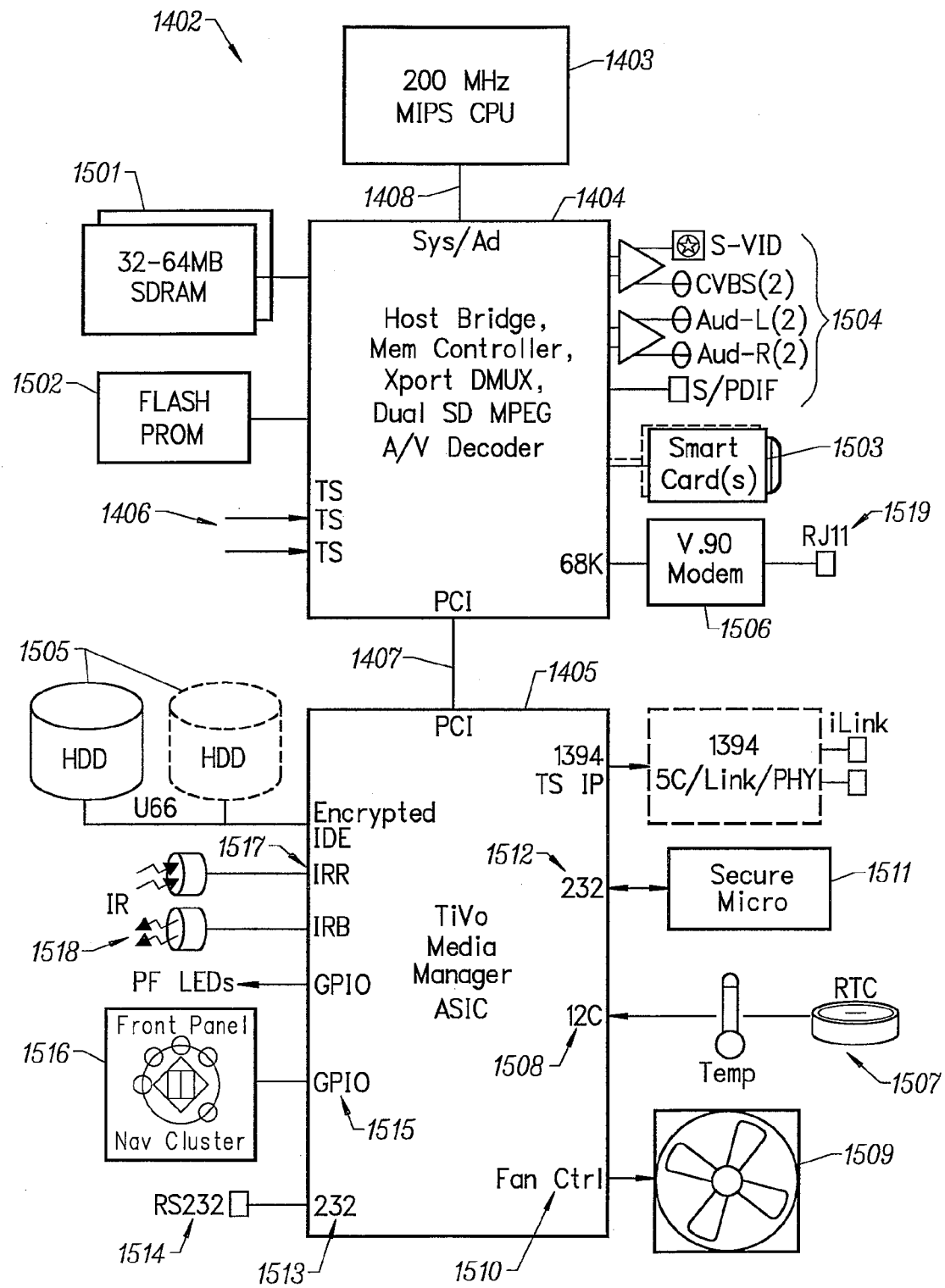
FIG. 15 is a block schematic diagram of an output section of the system of FIG. 14 according to the invention.

FIG. 15 shows the output section 1402 in greater detail. It will be appreciated that the output section encompasses the core components of the invention, the CPU 1403, the MPEG-2 decoder/graphics subsystem 1404, and the media manager 1405. The CPU 1403 functions primarily to run the system software, as well as middleware and application software. The system software includes the OS (Operating System) kernel and the device drivers. The system software operates to initialize and control the various hardware components of the system. A more detailed description of the function of the CPU has been provided above. Almost all data movement in the system is based on DMA transfers or dedicated high-speed transport interfaces that do not involve the CPU. While a variety of RISC processors would be suitable for use in the invention, the current embodiment employs a VR5432 CPU, manufactured by NEC Corporation of New York N.Y., that provides a 64-bit MIPS RISC architecture with a 32K instruction cache and 32K data cache, running at 202 MHz clock frequency. The CPU is connected with the MPEG-2 decoder/graphics subsystem 1404 by means of a system bus 1407.

An MPEG-2 decoder/graphics subsystem 1404, such as, for example, the BCM7020, supplied by Broadcom Corporation of Irvine Calif. can be considered the central component of the output section 1402. In fact, the MPEG-2 decoder/graphics subsystem 1404 incorporates a number of important components, including, but not limited to:

- a host bridge;
- a memory controller;
- an MPEG-2 transport de-multiplexer;
- at least one MPEG-2 decoder;
- an audio/video decoder;
- a PCI bridge;
- a bus controller;
- a modem interface; and
- a SMARTCARD interface.

As described above, the transport stream generated by the input section 1401 is fed into one of the transport interfaces 1406, whereupon it is demultiplexed into separate audio and video packet elementary streams (PES). These streams are then stored on the hard drive 1505 and played back through the outputs 1504. The transport stream demultiplexer included in the MPEG-2 decoder/graphics subsystem 1404 is responsible for the demultiplexing operation. Prior to being played back, the audio and video packet streams are retrieved from the hard drive and reassembled into a transport stream. The transport stream is then decoded to a video signal. The MPEG-2 transport stream decoder included in the component 1404 is responsible for decoding the MPEG-2 transport stream. The component 1404 also includes a graphics engine for generating high-quality on-screen displays, such as interactive program guides. The output side of the component 1404 provides several outputs; including S-video, audio, SPDIR (Stereo Paired Digital Interface), CVBS (Composite Video Baseband Signal). Additionally, a SMARTCARD interface 1503, and a modem port 1506 is provided to which a modem 1519 is interfaced. The SMARTCARD interface supports up to two SMARTCARD readers. More will be said about the SMARTCARD functionality below.

The output section 1402 further includes a memory element 1501, under the control of the OS kernel. The system software provides a single device driver interface that enables all other device drivers to allocate contiguous memory buffers typically used for DMA (Direct Memory Access). The memory element is preferably SDRAM (Synchronous Dynamic Random Access Memory), preferably at least 32 MB. However, other memory configurations are entirely within the spirit and scope of the invention. Furthermore, as will be described below, the invention may include other memory elements that are not under the control of the OS kernel.

A flash PROM (Programmable Read-only Memory) 1502 contains the boot code that initializes the system board state prior to booting the OS kernel, either from a hard drive or over a TCP/IP network connection. In addition to performing basic system startup tasks such as memory test and POST (Power-On Self Test), the PROM 1502 also serves as a key component in the physical architecture of the system by ensuring that neither the PROM itself nor the OS kernel it is booting have been tampered with. This is accomplished by computing digital signatures over the PROM code as well as the OS kernel image.

As previously indicated, the media manager 1405, connected to the MPEG-2 decoder/graphics subsystem 1404 by means of the PCI bus 1407, performs a bridging or mediating function between many of the hardware components of the system, notably the CPU 1403, the hard disk or storage device 1505, and memory 1501. The media manager 1405 provides this function by virtue of the assortment of interfaces and I/O devices integrated within the media manager. In the preferred embodiment of the invention, the media manager is implemented in an ASIC (Application Specific Integrated Circuit). However, the media manager could also be implemented in a programmable logic device, or it could also be composed of discrete devices. The media manager 1405 integrates at least the following:

- an IDE host controller, with data encryption;
- a DMA controller;
- IR receiver/transmitter interface;
- multiple UART's (Universal Asynchronous Receiver/Transmitter);
- multiple I²C (Inter-IC) buses;
- multiple GPIO's (General Purpose I/O's);
- a PCI bus arbiter;
- an MPEG-2 media stream processor;
- a PCM (Pulse Code Modulation) audio mixer;
- a high-speed transport output interface;
- a fan speed control; and
- front panel keyboard matrix scanner.

As shown in FIG. 15, the media manager includes a thermocouple 1507 for monitoring system temperature. The thermocouple is interfaced with the media manager through one of the I²C buses 1508. In turn, fan speed is controlled by the system software, based on input from the thermocouple, through the fan control 1510 controlling the fan 1509, to maintain the system at an optimal operating temperature.

As previously described, the media manager also mediates the transfer of media streams between the CPU 1403, memory 1501, and the hard drive 1505. This is accomplished through the action of the media stream processor and the high-speed transport output interface mentioned above.

A secure micro controller, such as, for example, an AT90S3232C supplied by ATMEL Corporation of San Jose Calif., 1511 is interfaced with the media manager ASIC 1405 through one of the UART's 1512. Preferably, the micro controller 1511 is one specifically designed for cryptographic applications such as encryption and authentication. In addition to providing a master key for disk encryption as described below, the micro controller also contains a private key unique to each unit that is created randomly during manufacturing. Once written into the component, the key cannot be read out and can only be used to respond to authentication challenges.

As shown, up to two hard drives 1505 are provided for storage of recorded video programming. As described above, the IDE host controller is integrated on the media manager ASIC 1405 and provides a disk encryption feature that can be applied to either disk drive on a per-transfer basis. The micro controller, as described above, generates, encrypts and decrypts a master key for disk encryption purposes.

An RS232 port 1514 interfaces with another of the UART's 1513. A front panel navigation cluster 1516 is interfaced with the media manager ASIC through one of the GPIO's 1515. An IR receiver and transmitter 1518 are interfaced with the media manager ASIC through an IR receiver/transmitter interface 1517. The IR receiver assembly is mounted in the front panel navigation cluster, described in greater detail below, behind a transparent window. It receives a modulated signal from a handheld remote control and outputs the signal as is to the media manager ASIC, which either dispatches it to the CPU for further processing or provides a pass-through path to the IR transmitter 1518.

A real-time clock (not shown) is interfaced with the media manager through one of the I²C ports. Because the invention is intended for use as a personal video recorder, in which the user is able to program the system in advance to record selections at specified times, a real-time clock is a fundamental requirement.

Figure 16:
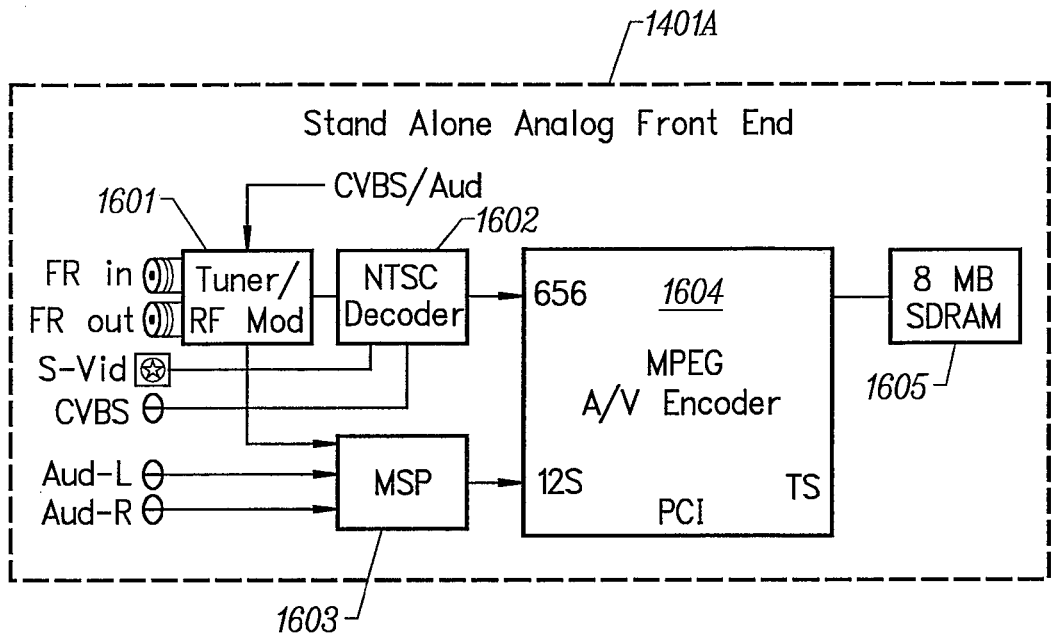
FIG. 16 is a block schematic diagram of a first version of an input section of the system of FIG. 14, adapted to receive an analog signal according to the invention

As previously described, the input signal is accepted by an input section 1401 passed to the output section 1402 as an MPEG-2 transport stream. The input section is provided in one of several configurations, according to the type of source originating the signal. By providing an input section 1401 individualized to source type, while keeping the output section the same across all versions, it is possible to produce units in various configurations with only minor modifications to the system board. In this way, the scale of the manufacturing challenge posed by producing units to serve different markets is considerably reduced. Referring now to FIG. 16, an input section 1401a adapted to accept analog signals is shown. In the preferred embodiment, the analog input section accepts analog signals in a variety of formats: composite video, NTSC, PAL, SECAM or S-video.

In the case of NTSC signals, a tuner/RF demodulator 1601, such as the TMDH-2 supplied by ALPS Electric, of San Jose Calif., sets the signal to the desired channel. Preferably, the tuner assembly incorporates the tuner, an RF demodulator and an RF bypass into the same component. The tuner assembly is controlled over the I²C bus port exposed by the media manager ASIC 1405.

A multi-standard sound processor 1603, such as a MSP4448G, supplied by Micronas Semiconductor of Freiburg, Germany accepts analog audio input from the composite audio connectors or the tuner/RF demodulator 1601. Additionally, it accepts digital audio input over an I²S bus from the media manager ASIC 1405. The resulting audio signal is output to an MPEG encoder 1604 over the I²S bus.

The decoder 1602, an NTSC/PAL/SECAM video decoder, such as, for example a SAA7114H video decoder, supplied by Philips Semiconductor, of Eindhoven, the Netherlands, accepts input from either the tuner/RF demodulator 1601, the composite video inputs or the S-video input and converts it into the CCIR 656 (Comité Consultatif International des Radiocommunications, recommendation 656) digital format for input to an MPEG-2 encoder 1604, such as, for example a BCM7040, supplied by BROADCOM.

Figure 19A:
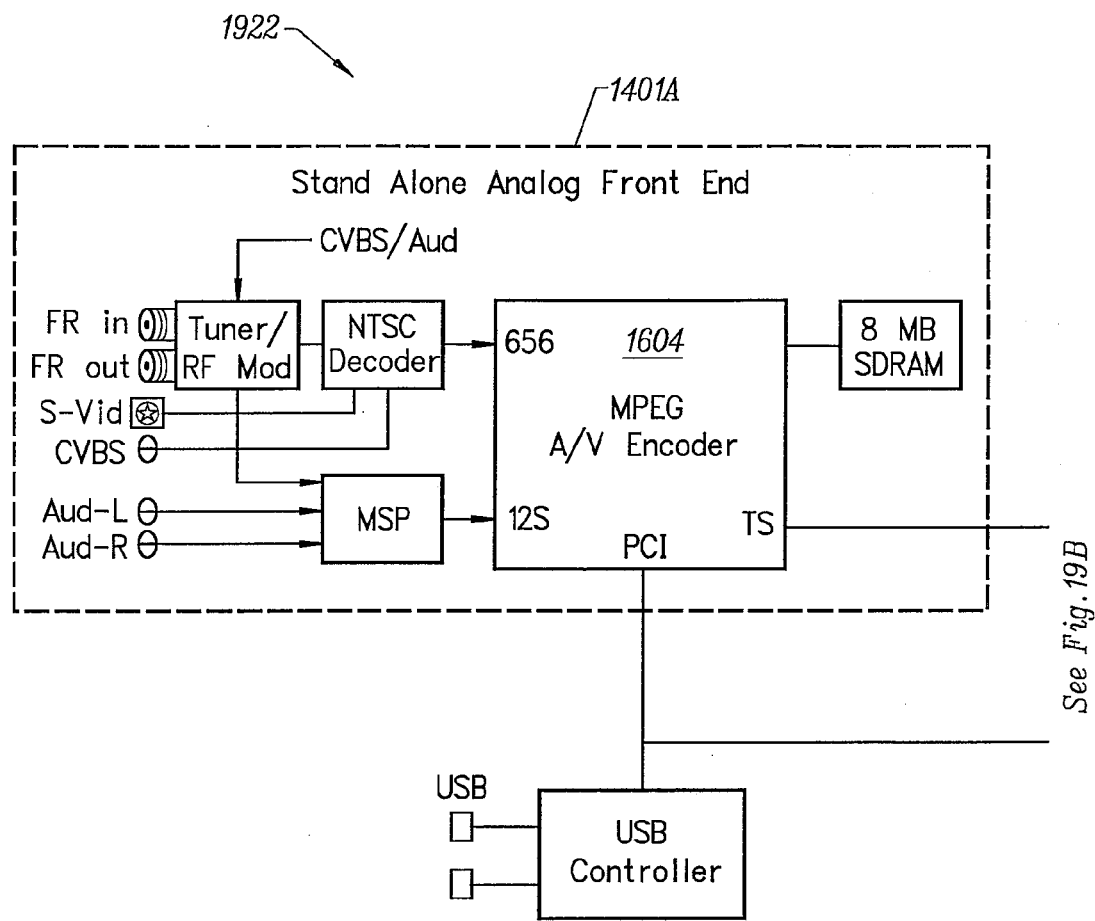
FIGS. 19A and 19B are a block diagram of a first embodiment of the system of FIG. 14 according to the invention.
Figure 19B:
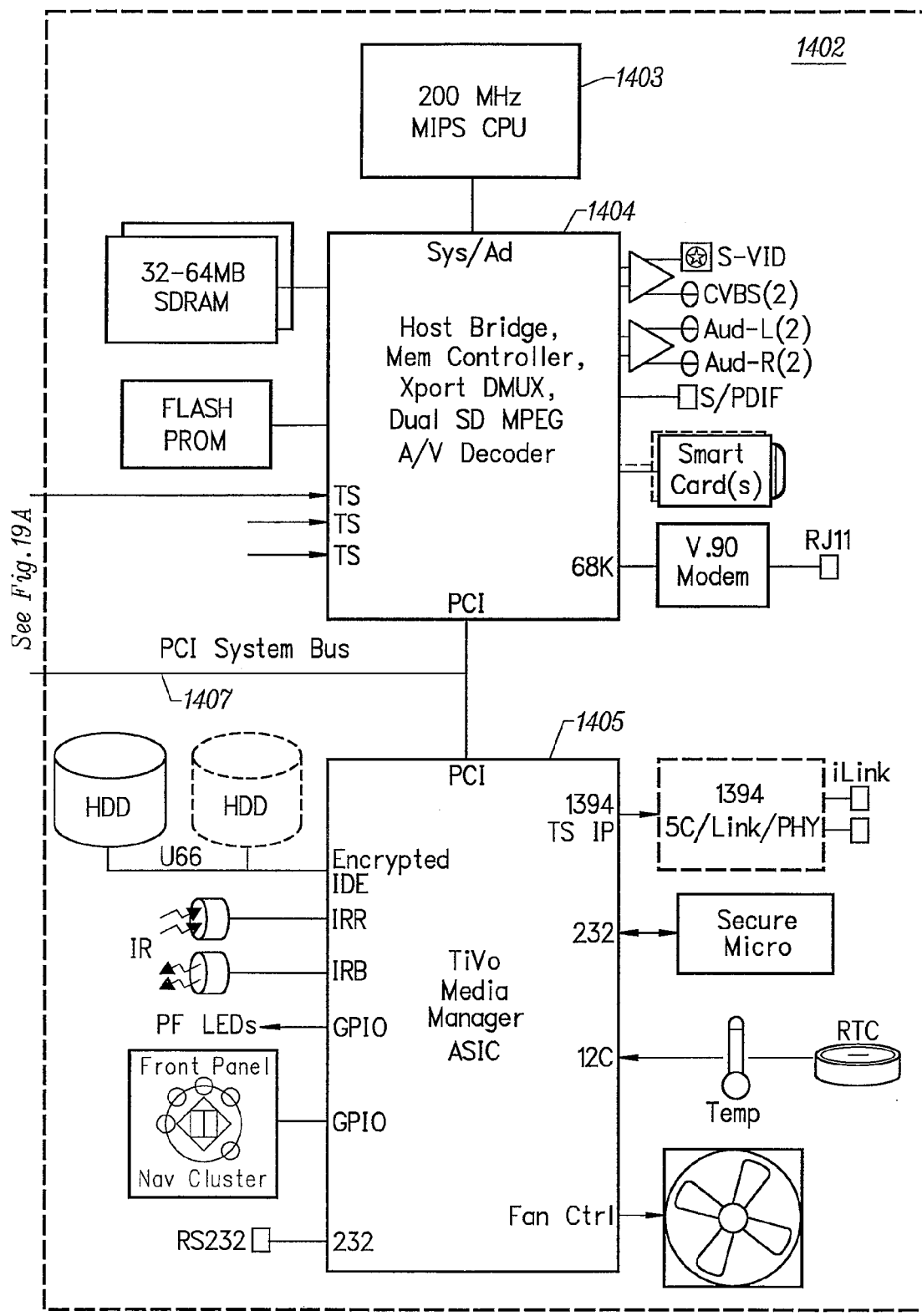

The MPEG-2 encoder 1604 accepts input from the NTSC/PAL/SECAM video decoder 1602 and the audio input previously mentioned and produces an MPEG-2 transport stream as the output. In the preferred embodiment of the invention, the encoder 1604 is programmed to multiplex the audio and video inputs into a constant bitrate (CBR) MPEG-2 transport stream. However, in order to conserve disk space, it is also possible to program the encoder 1604 to produce a variable bit rate (VBR) stream. Subsequently, the transport stream is delivered to the decoder 1404 over the transport interface 1406 for demultiplexing and further processing. The input section 1401a further includes a memory element 1605 that is not under the control of the OS kernel. FIGS. 19A and 19B provide a block schematic diagram of a system board 1900 incorporating the input section 1401a and the output section 1402. As shown, the MPEG-2 encoder is connected to the MPEG-2 decoder/graphics subassembly 1404 as a client on the PCI bus 1407.

A variation (not shown) of the analog front end includes a secondary input via an additional set of composite audio/video and/or S-video connectors for content originating from camcorders or VCR's. Additional hardware and software support is necessary in order for the variation to be fully enabled.

Figure 17:
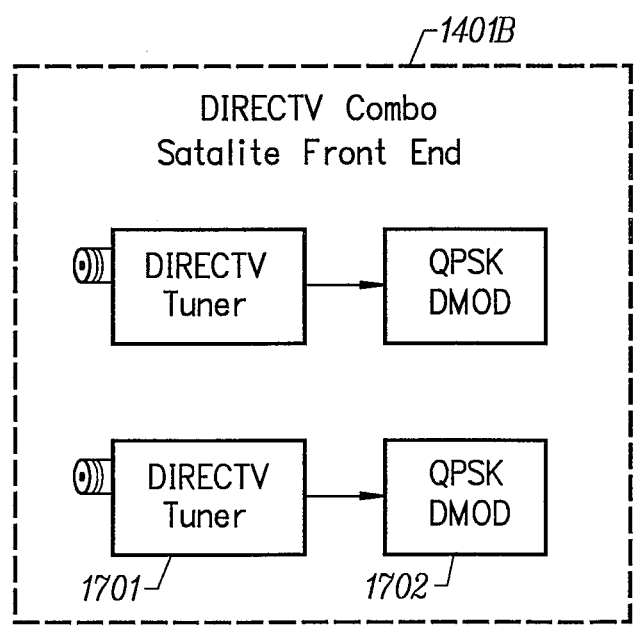
FIG. 17 is a block schematic diagram of a second version of an input section of the system of FIG. 14, adapted to receive a digital satellite signal according to the invention.
Figure 20A:
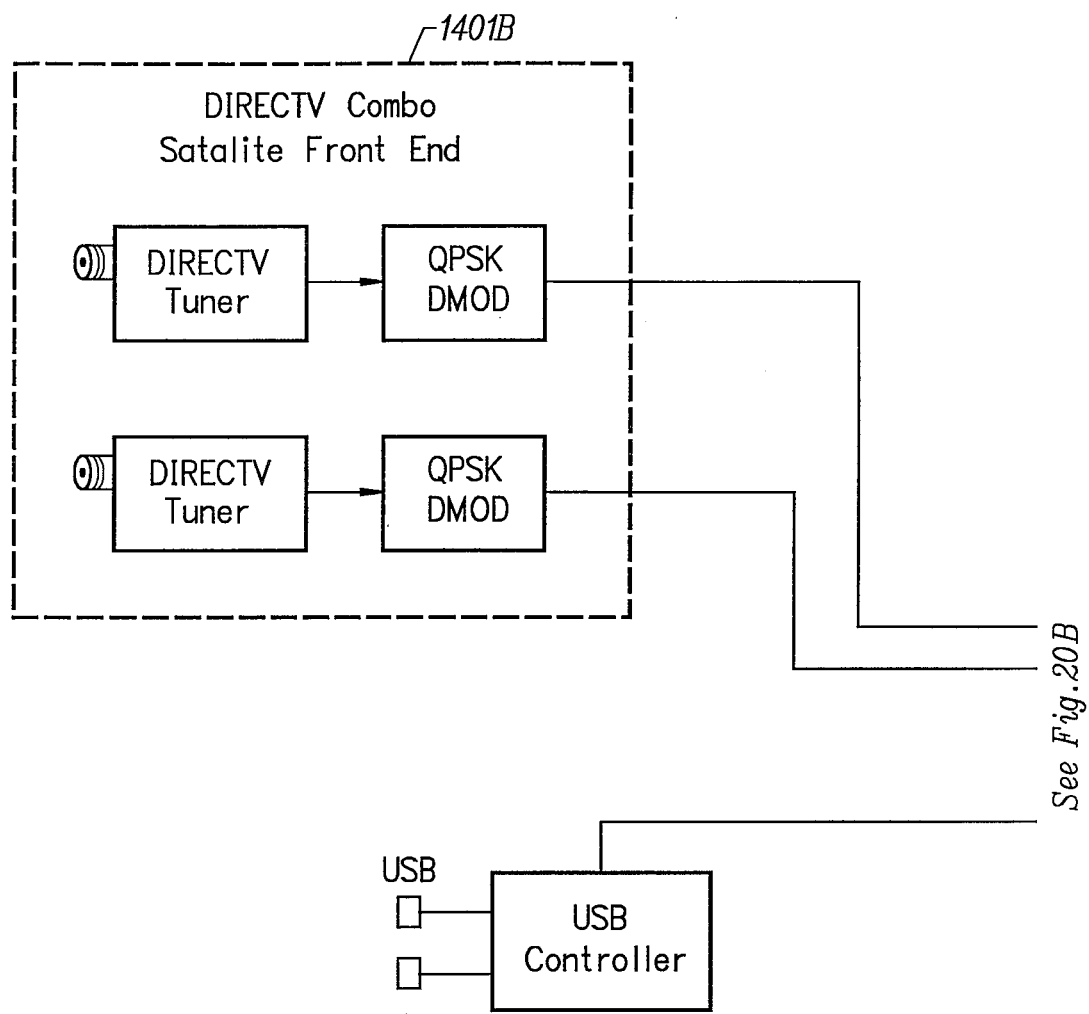
FIGS. 20A and 20B are a block schematic diagram of a second embodiment of the system of FIG. 14 according to the invention.
Figure 20B:
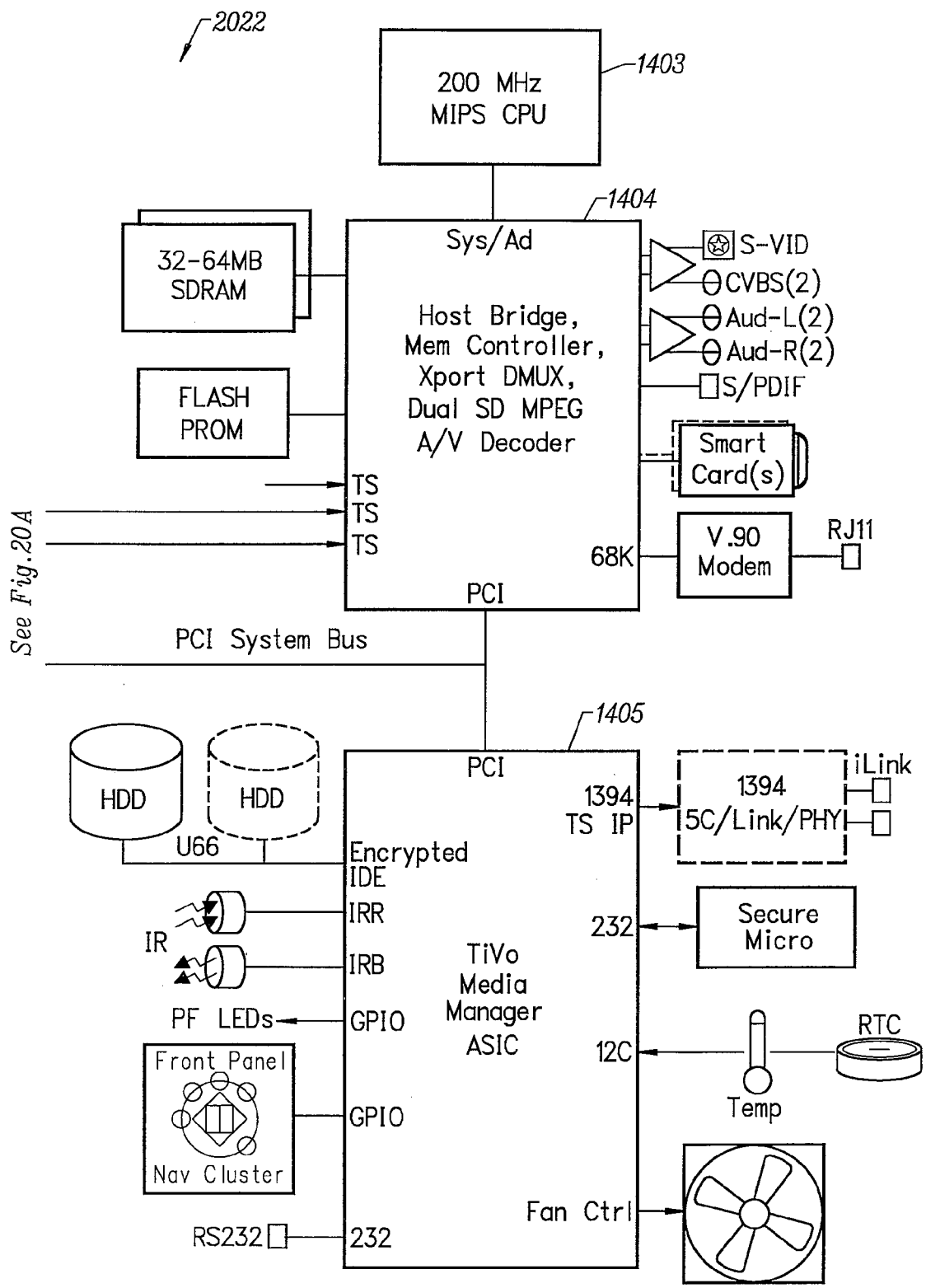

Turning now to FIG. 17, an input section 1401b is shown adapted to accept a digital satellite signal. The digital satellite input section 1401b accepts input from dual satellite receivers 1701. Demodulators 1702 demodulate the incoming QPSK (quadrature phase shift keying) to yield a transport stream. Because the satellite transport stream is not fully MPEG-2 compliant, the MPEG-2 decoder/graphics subassembly 1404 must have the capability of decoding either type of stream. Thus, the transport stream is passed to the output section 1402 via the transport interface 1406 without any further modification or processing. FIGS. 20A and 20B provide a block diagram of a system board 2000 incorporating the input section 1401b.

Figure 18:
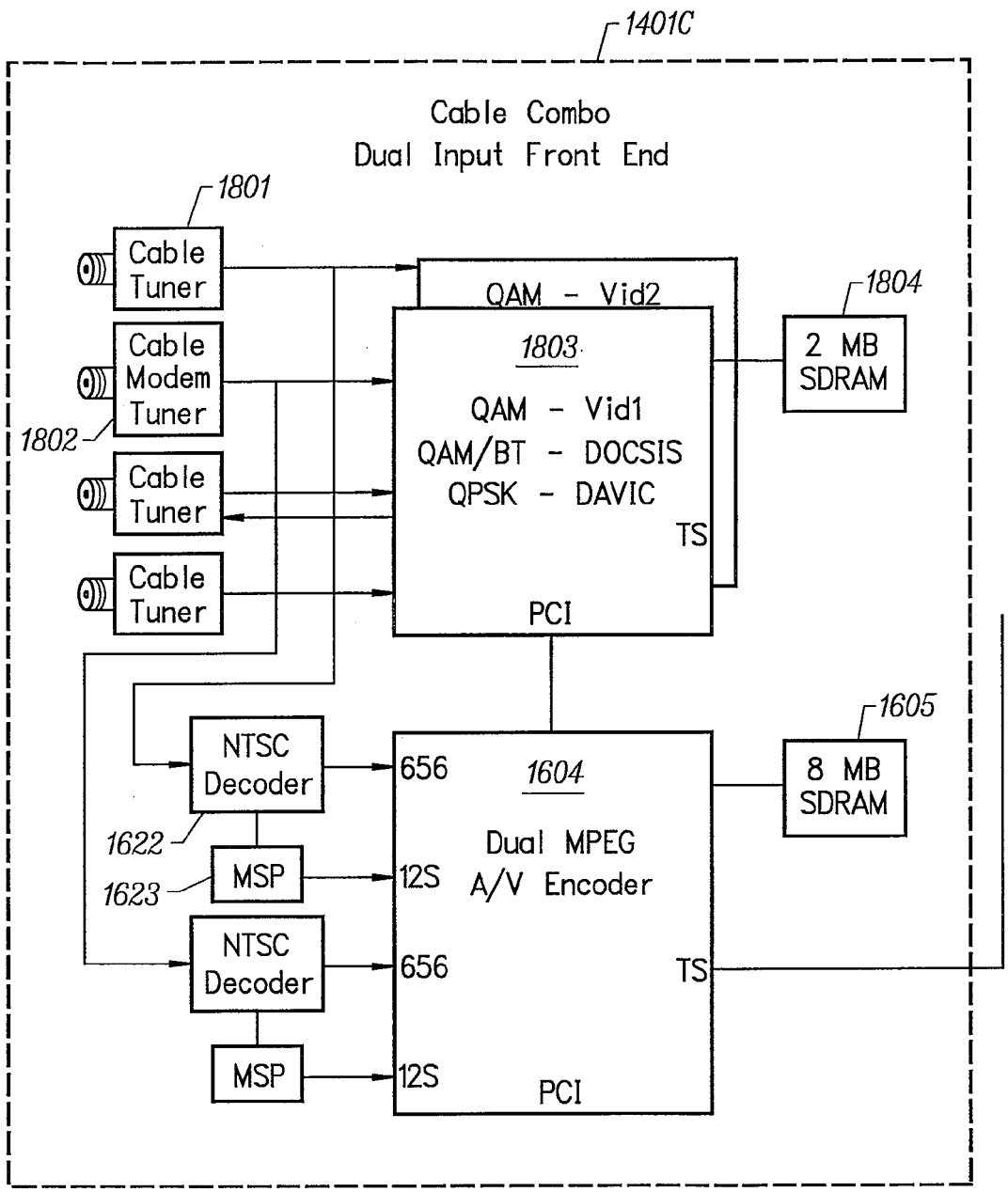
FIG. 18 is a block schematic diagram of a third version of an input section of the system of FIG. 14, adapted to receive a digital cable signal according to the invention.
Figure 21A:
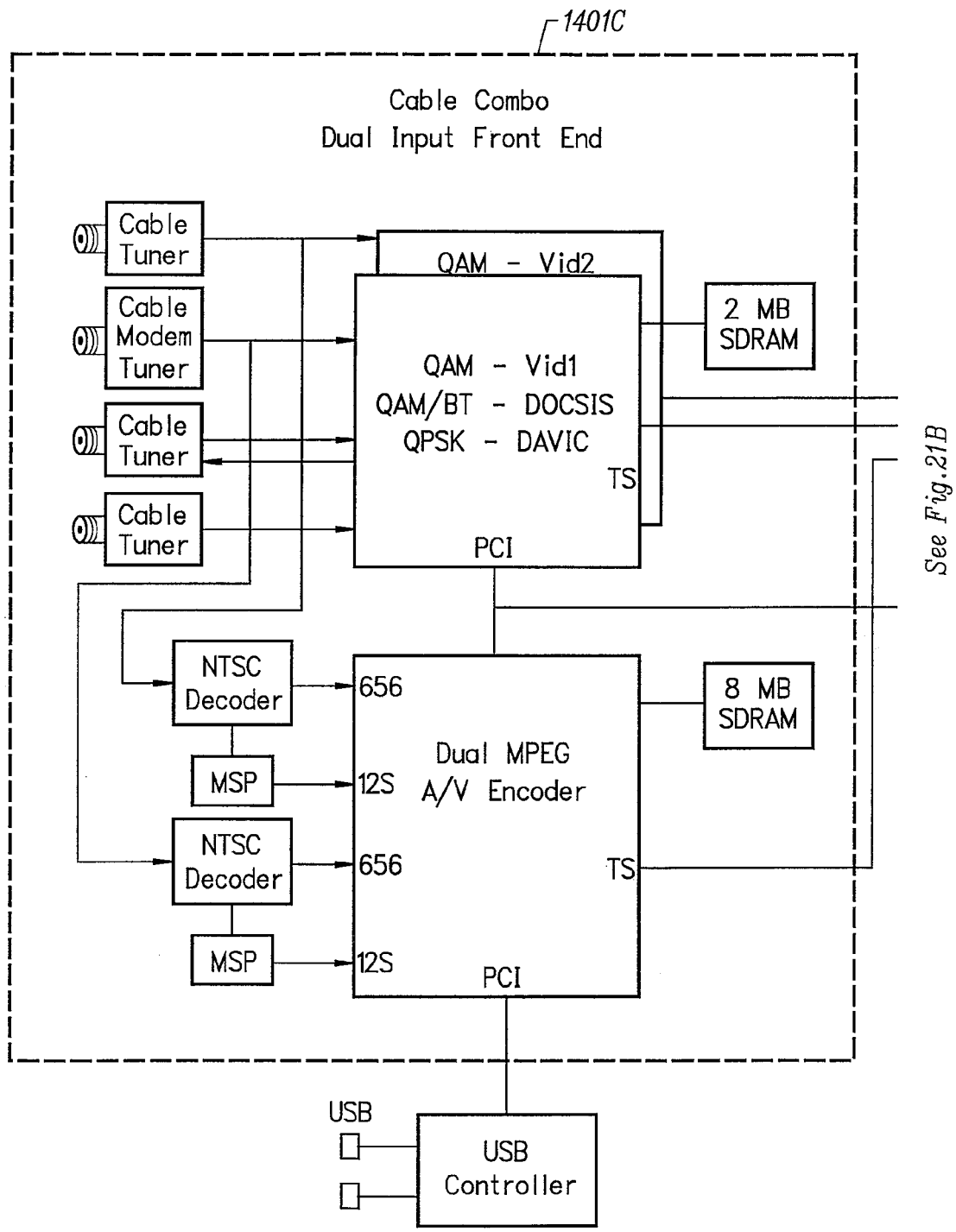
FIGS. 21A and 21B are a block schematic diagram of a third embodiment of the system of FIG. 14 according to the invention.
Figure 21B:
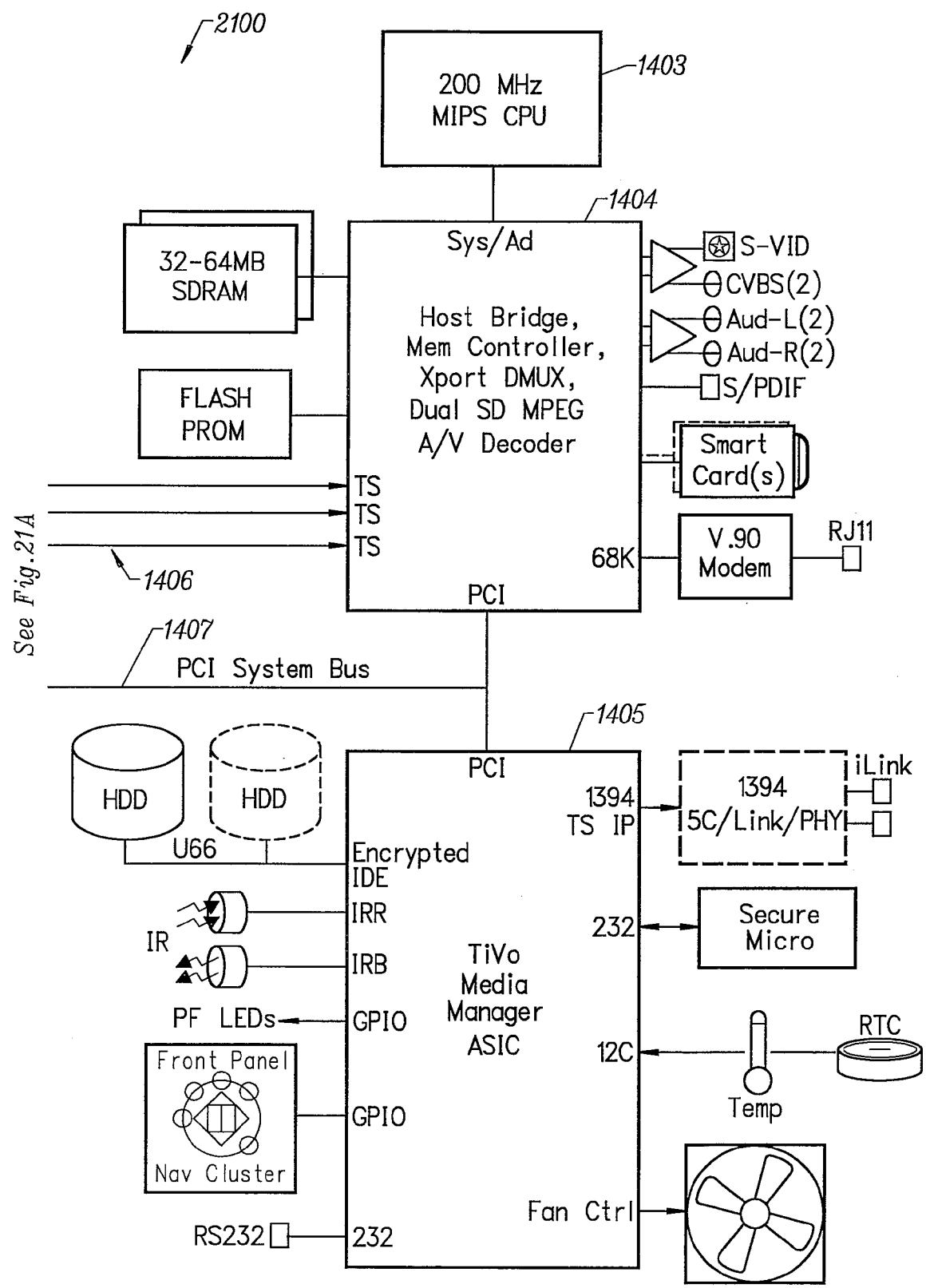

Referring to FIG. 18, an input section 1401c designed to accept either digital or analog cable input is shown. The input section accepts input from one or more RF coaxial connectors 1801, 1802 in both digital and analog format. The analog portion functions similarly to that of the analog input section 1401a. The video signal is decoded by dual NTSC decoders 1602. The audio is processed by dual multi-standard sound processors 1603 and the resulting output is fed to dual MPEG-2 encoders. It should be noted that, in the current version of the input section, each component is provided in duplicate. The digital cable signal is routed to dual demodulators 1803. Depending on the cable signal modulation, the demodulators may be either or both of QAM (quadrature amplitude modulation) and QPSK, either with or without DOCSIS (Data Over Cable Service Interface Specification) and/or DAVIC (Digital Audio Visual Council) support. As shown, the digital signal demodulators have associated with them a memory element 1804 that is controlled independently of the OS kernel. FIGS. 21A and 21B provide a block diagram of a system board 2100 incorporating the digital cable input section 1401c. As in the previous versions, transport streams are passed to the output section 1402 via the transport interface 1406. The digital cable input section 1401c is connected to the MPEG-2 decoder/graphics subsection 1404 as a client on the PCI bus.

As previously described, the invention is intended to be used as a PVR (Personal Video Recorder), in which a user may view a selected video stream in real-time, or they may view a recorded video stream, examining the video stream by taking advantage of such features as rewind, pause, play, stop, slow play, fast forward, and the like. Furthermore, controls are provided for selecting programming to be recorded and for specifying additional recording parameters. To that end, the invention includes user control interfaces. Primarily, user interaction with the invention is by way of a battery-powered, handheld IR remote control. Activating the various controls by the user causes a modulated IR beam to be emitted and received by the PVR. The IR receiver/transmitter system and interface have been previously described in detail. However, an alternate embodiment of the invention provides an RF-enabled remote control, receiver/transmitter and interface, either instead of or in addition to the IR driven remote control.

In addition to the remote control, the user may interact with the invention by means of a navigation cluster, comprising buttons or keys, on a front panel of the unit. Advantageously, the navigation cluster substantially duplicates the functions of the remote control. Thus, the navigation cluster permits control of the invention, even if the remote control is lost, or stolen, or needs the batteries replaced. As described above, an interface for the navigation cluster is provided on the media manager ASIC.

As previously indicated, the system board supports SMARTCARD functionality. A SMARTCARD reader is accessible through a slot provided on the front panel of the invention. The SMARTCARD slot is intended for use in commerce applications where user authentication is required for billing purposes, such as pay-per-view programming, music sales, merchandise sales and the like.

The invention is produced using conventional manufacturing techniques well known to those skilled in the art of microelectronics design and manufacturing.

Figure 22:
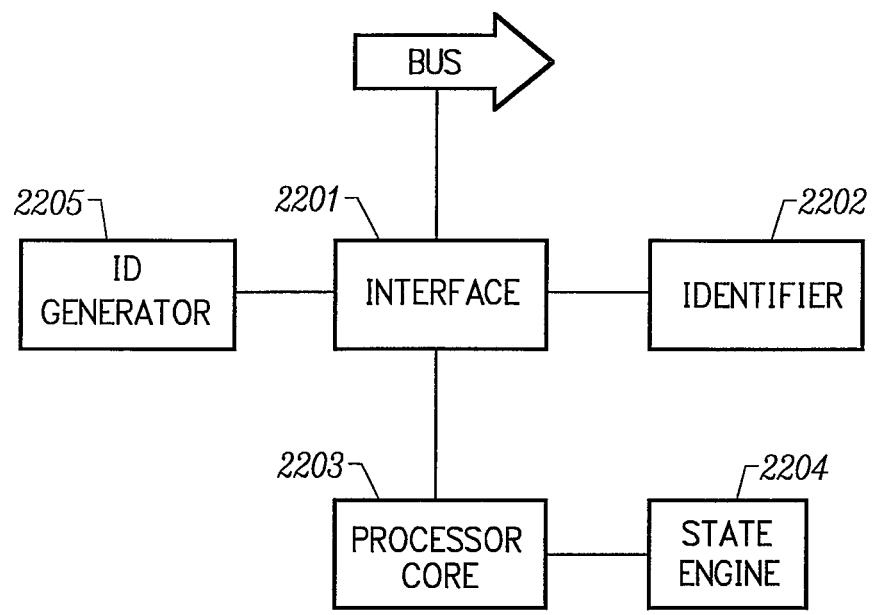
FIG. 22 is a block schematic diagram of a system for processing media stream data across multiple channels, in parallel according to the invention.

As described above, the media manager ASIC includes a media stream processor. Conventionally, media stream processors have been only able to process a single channel, providing a serious bottleneck to the system's throughput. Related, commonly owned applications have described multi-channel media processors that eliminate this bottleneck. Additionally, conventional media stream processors have had to be in the data path of the stream they are processing. Such a requirement necessitates that the processor be integrated on the system board in a manner that would make it very difficult to upgrade the media stream processor without replacing the system board. It would be a great advantage to provide a system independent device to upgrade a PVR's media stream processor capability from single-channel to multi-channel, which could be flexibly incorporated with existing hardware. To that end; the invention provides a system-independent, multi-channel media stream processor 1000. As FIG. 22 shows, the multi-channel media stream processor includes:

a system interface 2201;
a media stream identifier 2202;
a media stream processor core 2203;
a multi-channel state engine 2204; and
a media stream identification generator 2205.

The system interface 2201 serves as a completely passive, slave client on the system bus, not interfering in any way with data transfer, merely observing or "sniffing" the bus. While the remaining components of the invented media stream processor are system-independent, the system interface 2201 may be tailored to a specific system, or it may be adapted to connect to several different systems, either by means of hardwired elements, or through the use of programming switches. In the case of a unique or proprietary system, the system interface can be placed to observe on the memory bus instead, owing to the fact that hardware and protocols on memory buses are nearly universally uniform. The system interface provides a connection by which the media processor may observe the system bus.

System data is sent to the media stream identifier 2202, which distinguishes media streams from other data, in order to identify data that needs to be processed. The media stream identifier uses information such as source and destination addresses, which in most systems are hardwired signals, to identify media streams.

As media streams are identified, the media stream identification generator 2205 tags media stream data objects so that they may be associated with their respective media streams. Following tagging, the media stream data is routed to the media stream processor core 2203, where it is processed in parallel, rather than in a single channel. By processing the media streams in this manner, it is possible to achieve a four to eightfold increase in throughput.

In the case of multiple media streams, the multi-channel state engine 2204 saves the state of the media processor when a different media stream identification is presented, indicating that the media stream has switched. When the original media stream is again presented, the state is reloaded and processing of the original stream is resumed.

The resulting process is saved to a media data structure. Such data structures are commonly known. As each stream is processed, it is sent to system memory as needed.

While the multi-channel media stream processor has been described herein as an upgrade device, it also could be incorporated into a new system as the media processor. It provides the advantage of being easily incorporated into a system architecture without requiring major retooling of the system board.

The multi-channel media stream processor may be implemented using discrete components or in a programmable logic device, using known methods of programming such devices.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A system for the simultaneous storage and retrieval of multimedia data, comprising:
   an input section that acquires an input signal, the input section creates a transport stream from the input signal;
   a processor;
   a decoder subsystem that decodes the transport stream, the decoder subsystem is communicatively connected to the processor;
   a media switch communicatively connected to the decoder subsystem, the media switch operative to interface a plurality of system components and operates asynchronously from the processor, wherein the media switch includes:
      a host controller;
      a DMA controller;
      a bus arbiter; and
      a multimedia data stream processor; and
   a storage subsystem communicatively connected to the media switch, wherein multimedia data are stored on the storage subsystem and retrieved from the storage subsystem essentially simultaneously.

2. The system of claim 1, wherein the input section is adapted to accept a digital satellite input signal.

3. The system of claim 1, wherein the input section comprises:
   at least one satellite tuner; and
   at least one demodulating element to demodulate the digital satellite signal to a transport stream.

4. The system of claim 1, wherein the input section is adapted to accept an input signal in both analog and digital formats from at least one RF coaxial connector.

5. The system of claim 4, wherein the input section comprises:
   at least one tuner for selecting a desired channel;
   at least one decoder for digitizing a video component of the input signal;

at least one sound processor for processing an audio component of the input signal into a digitized audio component;

an encoder having multi-stream encode capability, wherein the encoder receives the digitized video and audio components, whereupon the digitized video and audio components are encoded and multiplexed into a transport stream.

6. The system of claim 1, the decoder subsystem further comprising a transport stream decoder/graphics subsystem.

7. The system of claim 6, wherein the transport stream decoder/graphics subsystem includes at least one of:
a host bridge;
a memory controller;
an MPEG-3 transport demultiplexer;
an MPEG-3 decoder;
an audio/video decoder;
a graphics processor;
a bus bridge; or
a bus controller.

8. The system of claim 7, the transport stream decoder/graphics subsystem further comprising at least one transport stream interface, wherein the transport stream interface receives the transport stream from the input section.

9. The system of claim 7, wherein the transport stream is demultiplexed into audio and video packet streams, wherein the audio and video packet streams are stored and played back through an output side of the transport stream decoder/graphics subsystem.

10. The system of claim 7, further comprising a SDRAM connected to the transport stream decoder/graphics subsystem.

11. The system of claim 1, wherein the processor is operative to run system software, middleware, and application software.

12. The system of claim 1, wherein the media switch is implemented in an ASIC (Application Specific Integrated Circuit) or a programmable logic device.

13. The system of claim 1, further comprising a front panel navigation cluster coupled to a GPIO (General Purpose Input/Output) included in the media switch.

14. The system of claim 11, wherein the system software includes at least: an operating system kernel and device drivers, the system software operative to initialize and control hardware components.

* * * * *